(12) United States Patent
Kubo et al.

(10) Patent No.: US 8,150,198 B2
(45) Date of Patent: Apr. 3, 2012

(54) IMAGE PROCESSING APPARATUS AND METHOD AND IMAGE DISPLAY APPARATUS

(75) Inventors: Toshiaki Kubo, Tokyo (JP); Satoshi Yamanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 944 days.

(21) Appl. No.: 12/153,777

(22) Filed: May 23, 2008

(65) Prior Publication Data

US 2008/0298707 A1   Dec. 4, 2008

(30) Foreign Application Priority Data

May 30, 2007   (JP) ................................. 2007-142878

(51) Int. Cl.
*G06K 9/40*   (2006.01)
(52) U.S. Cl. ........................................ 382/264; 382/261
(58) Field of Classification Search ........... 382/254–275
See application file for complete search history.

(56) References Cited

U.S. PATENT DOCUMENTS

| | | | |
|---|---|---|---|
| 6,895,124 B1 * | 5/2005 | Kira et al. ................. | 382/260 |
| 2003/0156761 A1 * | 8/2003 | Ogata et al. ............. | 382/251 |
| 2005/0152614 A1 * | 7/2005 | Daly et al. ............... | 382/268 |
| 2006/0098892 A1 * | 5/2006 | Sugeno et al. ........... | 382/265 |
| 2006/0197993 A1 | 9/2006 | Yamanaka et al. | |
| 2006/0251335 A1 * | 11/2006 | Sugimoto ................. | 382/275 |
| 2007/0071355 A1 * | 3/2007 | Imai ........................ | 382/266 |
| 2007/0188525 A1 * | 8/2007 | Yamanaka et al. ....... | 345/690 |
| 2008/0019600 A1 * | 1/2008 | Takita et al. ............. | 382/254 |
| 2008/0175510 A1 * | 7/2008 | Matsushita .............. | 382/260 |
| 2009/0016633 A1 * | 1/2009 | Miyasaka ................ | 382/255 |
| 2009/0141998 A1 * | 6/2009 | Kubo et al. .............. | 382/264 |
| 2010/0260432 A1 * | 10/2010 | Shimizu et al. .......... | 382/255 |

FOREIGN PATENT DOCUMENTS

| | | |
|---|---|---|
| JP | 10-84481 A | 3/1998 |
| JP | 2005-117449 | 4/2005 |
| JP | 2006-050358 A | 2/2006 |
| JP | 2006-222479 A | 8/2006 |
| JP | 2007-96509 | 4/2007 |
| JP | 2007-158847 A | 6/2007 |
| JP | 2007-181189 A | 7/2007 |

OTHER PUBLICATIONS

Hinamoto et al., "Hisenkei dijitaru shingo shori (Non-linear signal processing)," Asakura shoten, 1999, pp. 106-107.

\* cited by examiner

*Primary Examiner* — Jingge Wu
(74) *Attorney, Agent, or Firm* — Birch Stewart Kolasch & Birch, LLP

(57) ABSTRACT

An image processing apparatus receives n-bit image data, carries out an α-bit bit extension, and outputs (n+α)-bit image data, where n and α are positive integers. The apparatus also performs an epsilon filtering operation that uses the additional gray levels provided by the bit extension to smooth out false edges caused by the bit extension without smoothing out real edges. The output image preserves both the smoothness of regions of gradual change and the sharpness of abrupt changes in the input image.

14 Claims, 41 Drawing Sheets

| PIXEL POSITION k | l2 | l1 | c | r1 |
|---|---|---|---|---|
| DATA DM(k) | 4Y | 4Y | 4Y | 4Y+4 |
| DIFFERENCE DATA ED(k) | 0 | 0 | 0 | 4 |
| DECISION DATA EE(k) | 1 | 1 | 1 | 1 |
| f{ED(k)} | 0 | 0 | 0 | 4 |
| EM | 1 | | | |

FIG.14

| PIXEL POSITION k | l2 | l1 | c | r1 |
|---|---|---|---|---|
| DATA DM(k) | 4Y | 4Y | 4Y | 4Y+16 |
| DIFFERENCE DATA ED(k) | 0 | 0 | 0 | 16 |
| DECISION DATA EE(k) | 1 | 1 | 1 | 0 |
| f{ED(k)} | 0 | 0 | 0 | 0 |
| EM | 0 | | | |

FIG.16A
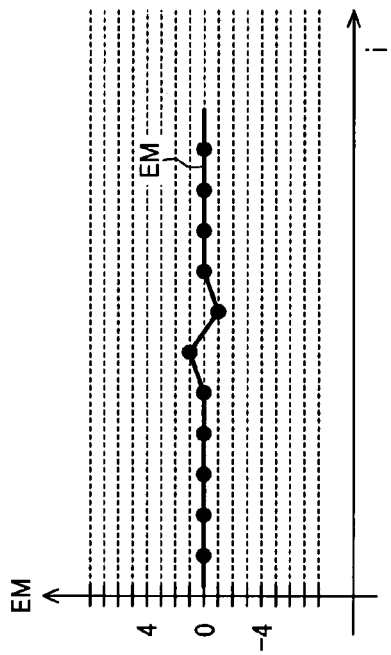
FIG.16B
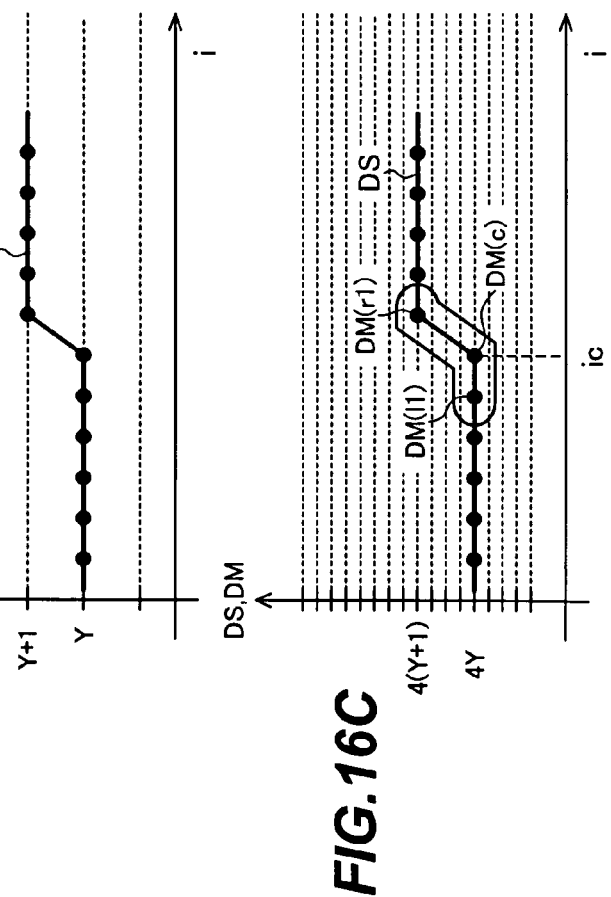
FIG.16C
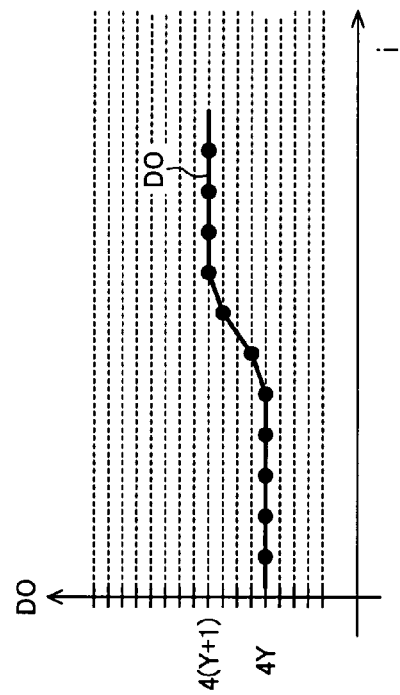
FIG.16D
FIG.16E

FIG.17

| PIXEL POSITION k | l1 | c | r1 |
|---|---|---|---|
| DATA DM(k) | 4Y | 4Y | 4Y+4 |
| DIFFERENCE DATA ED(k) | 0 | 0 | 4 |
| DECISION DATA EE(k) | 1 | 1 | 1 |
| f{ED(k)} | 0 | 0 | 4 |
| EM | 0 ||  |

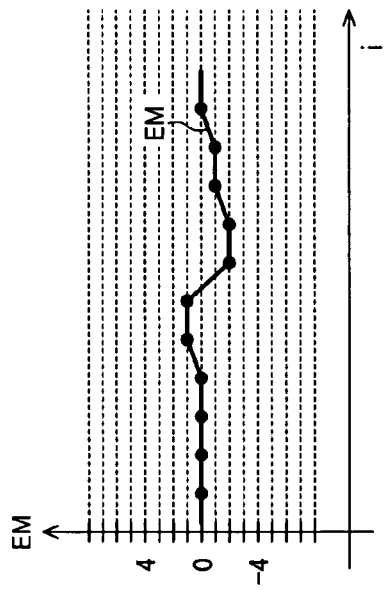
FIG.19D
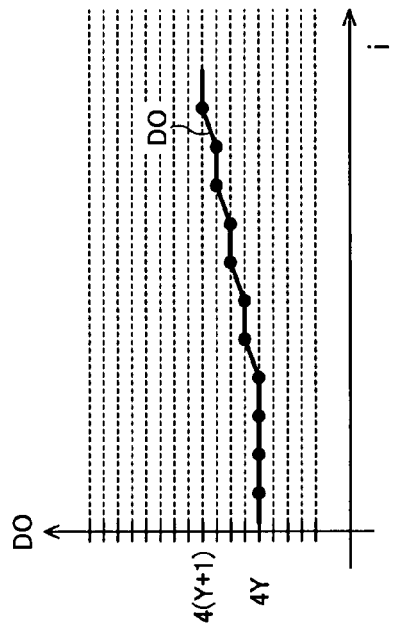
FIG.19E
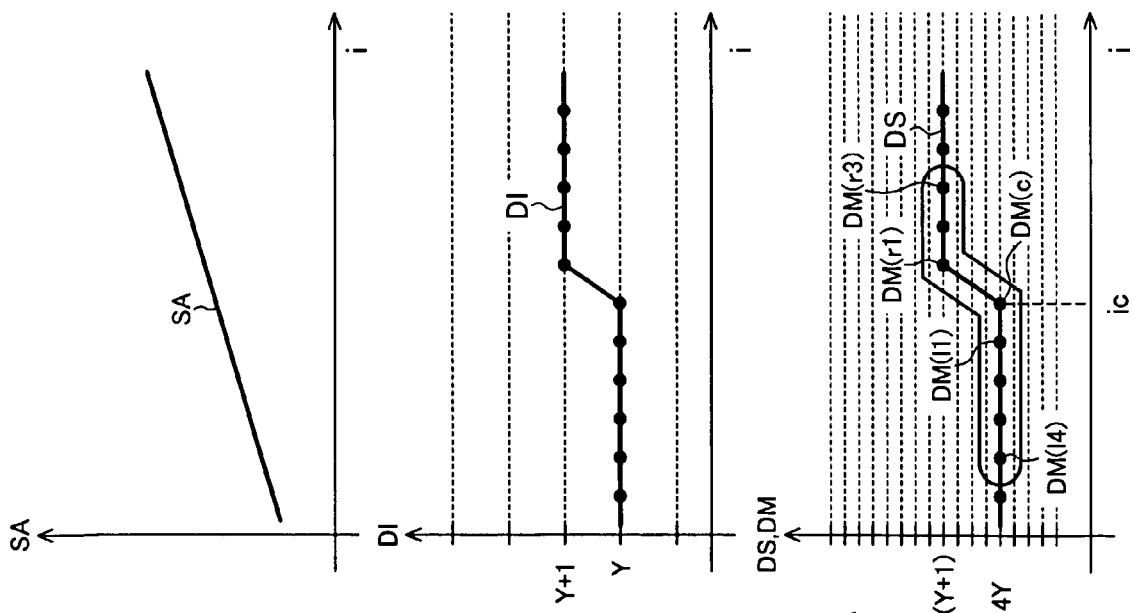
FIG.19A
FIG.19B
FIG.19C

| PIXEL POSITION k | l4 | l3 | l2 | l1 | c | r1 | r2 | r3 |
|---|---|---|---|---|---|---|---|---|
| DATA DM(k) | 4Y | 4Y | 4Y | 4Y | 4Y | 4Y+4 | 4Y+4 | 4Y+4 |
| DIFFERENCE DATA ED(k) | 0 | 0 | 0 | 0 | 0 | 4 | 4 | 4 |
| DECISION DATA EE(k) | 1 | 1 | 1 | 1 | 1 | 1 | 1 | 1 |
| f{ED(k)} | 0 | 0 | 0 | 0 | 0 | 4 | 4 | 4 |
| EM | 1 ||||||||

FIG.25A

| Y | Y | Y | Y+1 | Y+1 | Y+1 |
|---|---|---|-----|-----|-----|
| Y | Y | Y | Y+1 | Y+1 | Y+1 |
| Y | Y | Y | Y+1 | Y+1 | Y+1 |
| Y | Y | Y | Y+1 | Y+1 | Y+1 |
| Y | Y | Y | Y+1 | Y+1 | Y+1 |
| Y | Y | Y | Y+1 | Y+1 | Y+1 |

FIG.25B

| 4Y | 4Y | 4Y | 4Y+4 | 4Y+4 | 4Y+4 |
|----|----|----|------|------|------|
| 4Y | 4Y | 4Y | 4Y+4 | 4Y+4 | 4Y+4 |
| 4Y | 4Y | 4Y | 4Y+4 | 4Y+4 | 4Y+4 |
| 4Y | 4Y | 4Y | 4Y+4 | 4Y+4 | 4Y+4 |
| 4Y | 4Y | 4Y | 4Y+4 | 4Y+4 | 4Y+4 |
| 4Y | 4Y | 4Y | 4Y+4 | 4Y+4 | 4Y+4 |

FIG.27

| 4Y | 4Y | 4Y | 4Y+4 | 4Y+4 | 4Y+4 |
|---|---|---|---|---|---|
| 4Y | 4Y | 4Y | 4Y+4 | 4Y+4 | 4Y+4 |
| 4Y | 4Y | 4Y | 4Y+4 | 4Y+4 | 4Y+4 |
| 4Y | 4Y | 4Y | 4Y+4 | 4Y+4 | 4Y+4 |
| 4Y | 4Y | 4Y | 4Y+4 | 4Y+4 | 4Y+4 |
| 4Y | 4Y | 4Y | 4Y+4 | 4Y+4 | 4Y+4 |

| 0 | 0 | 1 | −2 | −1 | 0 |
|---|---|---|---|---|---|
| 0 | 0 | 1 | −2 | −1 | 0 |
| 0 | 0 | 1 | −2 | −1 | 0 |
| 0 | 0 | 1 | −2 | −1 | 0 |
| 0 | 0 | 1 | −2 | −1 | 0 |
| 0 | 0 | 1 | −2 | −1 | 0 |

FIG.29

| 4Y | 4Y | 4Y+1 | 4Y+2 | 4Y+3 | 4Y+4 |
|----|----|------|------|------|------|
| 4Y | 4Y | 4Y+1 | 4Y+2 | 4Y+3 | 4Y+4 |
| 4Y | 4Y | 4Y+1 | 4Y+2 | 4Y+3 | 4Y+4 |
| 4Y | 4Y | 4Y+1 | 4Y+2 | 4Y+3 | 4Y+4 |
| 4Y | 4Y | 4Y+1 | 4Y+2 | 4Y+3 | 4Y+4 |
| 4Y | 4Y | 4Y+1 | 4Y+2 | 4Y+3 | 4Y+4 |

FIG.30A

| Y | Y | Y | Y | Y | Y |
|---|---|---|---|---|---|
| Y | Y | Y | Y | Y | Y |
| Y | Y | Y | Y | Y | Y |
| Y+1 | Y+1 | Y+1 | Y+1 | Y+1 | Y+1 |
| Y+1 | Y+1 | Y+1 | Y+1 | Y+1 | Y+1 |
| Y+1 | Y+1 | Y+1 | Y+1 | Y+1 | Y+1 |

FIG.30B

| 4Y | 4Y | 4Y | 4Y | 4Y | 4Y |
|---|---|---|---|---|---|
| 4Y | 4Y | 4Y | 4Y | 4Y | 4Y |
| 4Y | 4Y | 4Y | 4Y | 4Y | 4Y |
| 4Y+4 | 4Y+4 | 4Y+4 | 4Y+4 | 4Y+4 | 4Y+4 |
| 4Y+4 | 4Y+4 | 4Y+4 | 4Y+4 | 4Y+4 | 4Y+4 |
| 4Y+4 | 4Y+4 | 4Y+4 | 4Y+4 | 4Y+4 | 4Y+4 |

FIG.31

| 4Y | 4Y | 4Y | 4Y | 4Y | 4Y |
|---|---|---|---|---|---|
| 4Y | 4Y | 4Y | 4Y | 4Y | 4Y |
| 4Y | 4Y | 4Y | 4Y | 4Y | 4Y |
| 4Y+4 | 4Y+4 | 4Y+4 | 4Y+4 | 4Y+4 | 4Y+4 |
| 4Y+4 | 4Y+4 | 4Y+4 | 4Y+4 | 4Y+4 | 4Y+4 |
| 4Y+4 | 4Y+4 | 4Y+4 | 4Y+4 | 4Y+4 | 4Y+4 |

| 0 | 0 | 0 | 0 | 0 | 0 |
|---|---|---|---|---|---|
| 0 | 0 | 0 | 0 | 0 | 0 |
| 1 | 1 | 1 | 1 | 1 | 1 |
| −2 | −2 | −2 | −2 | −2 | −2 |
| −1 | −1 | −1 | −1 | −1 | −1 |
| 0 | 0 | 0 | 0 | 0 | 0 |

FIG.42A

| Y | Y | Y | Y+1 | Y+1 | Y+1 |
|---|---|---|---|---|---|
| Y | Y | Y | Y+1 | Y+1 | Y+1 |
| Y | Y | Y | Y+1 | Y+1 | Y+1 |
| Y | Y | Y | Y | Y | Y |
| Y | Y | Y | Y | Y | Y |
| Y | Y | Y | Y | Y | Y |

FIG.42B

| 4Y | 4Y | 4Y | 4Y+4 | 4Y+4 | 4Y+4 |
|---|---|---|---|---|---|
| 4Y | 4Y | 4Y | 4Y+4 | 4Y+4 | 4Y+4 |
| 4Y | 4Y | 4Y | 4Y+4 | 4Y+4 | 4Y+4 |
| 4Y | 4Y | 4Y | 4Y | 4Y | 4Y |
| 4Y | 4Y | 4Y | 4Y | 4Y | 4Y |
| 4Y | 4Y | 4Y | 4Y | 4Y | 4Y |

| t2 |
|----|
| t1 |
| c  |
| b1 |

| 4Y | 4Y | 4Y | 4Y+4 | 4Y+4 | 4Y+4 |
|----|----|----|------|------|------|
| 4Y | 4Y | 4Y | 4Y+4 | 4Y+4 | 4Y+4 |
| 4Y | 4Y | 4Y | 4Y+4 | 4Y+4 | 4Y+4 |
| 4Y | 4Y | 4Y | 4Y   | 4Y   | 4Y   |
| 4Y | 4Y | 4Y | 4Y   | 4Y   | 4Y   |
| 4Y | 4Y | 4Y | 4Y   | 4Y   | 4Y   |

| PIXEL POSITION k | t2 | t1 | c | b1 |
|---|---|---|---|---|
| DATA VDM(k) | 4Y+4 | 4Y+4 | 4Y | 4Y |
| DIFFERENCE DATA VED(k) | 4 | 4 | 0 | 0 |
| DECISION DATA VEE(k) | 1 | 1 | 1 | 1 |
| f{VED(k)} | 4 | 4 | 0 | 0 |
| VEM | 2 | | | |

FIG.46

| 0 | 0 | 0 | 0 | 0 | 0 |
|---|---|---|---|---|---|
| 0 | 0 | 0 | 0 | 0 | 0 |
| 0 | 0 | 0 | −1 | −1 | −1 |
| 0 | 0 | 0 | 2 | 2 | 2 |
| 0 | 0 | 0 | 1 | 1 | 1 |
| 0 | 0 | 0 | 0 | 0 | 0 |

FIG.47

| 4Y | 4Y | 4Y | 4Y+4 | 4Y+4 | 4Y+4 |
|----|----|----|------|------|------|
| 4Y | 4Y | 4Y | 4Y+4 | 4Y+4 | 4Y+4 |
| 4Y | 4Y | 4Y | 4Y+3 | 4Y+3 | 4Y+3 |
| 4Y | 4Y | 4Y | 4Y+2 | 4Y+2 | 4Y+2 |
| 4Y | 4Y | 4Y | 4Y+1 | 4Y+1 | 4Y+1 |
| 4Y | 4Y | 4Y | 4Y | 4Y | 4Y |

FIG.48

| 4Y | 4Y | 4Y | 4Y+4 | 4Y+4 | 4Y+4 |
|----|----|----|------|------|------|
| 4Y | 4Y | 4Y | 4Y+4 | 4Y+4 | 4Y+4 |
| 4Y | 4Y | 4Y | 4Y+4 | 4Y+4 | 4Y+4 |
| 4Y | 4Y | 4Y | 4Y | 4Y | 4Y |
| 4Y | 4Y | 4Y | 4Y | 4Y | 4Y |
| 4Y | 4Y | 4Y | 4Y | 4Y | 4Y |

| PIXEL POSITION k | l2 | l1 | c | r1 |
|---|---|---|---|---|
| DATA BDM(k) | 4Y | 4Y | 4Y+4 | 4Y+4 |
| DIFFERENCE DATA BED(k) | -4 | -4 | 0 | 0 |
| DECISION DATA HEE(k) | 1 | 1 | 1 | 1 |

FIG.50

| 4Y | 4Y | 4Y | 4Y+4 | 4Y+4 | 4Y+4 |
|---|---|---|---|---|---|
| 4Y | 4Y | 4Y | 4Y+4 | 4Y+4 | 4Y+4 |
| 4Y | 4Y | 4Y | 4Y+3 | 4Y+3 | 4Y+3 |
| 4Y | 4Y | 4Y | 4Y+2 | 4Y+2 | 4Y+2 |
| 4Y | 4Y | 4Y | 4Y+1 | 4Y+1 | 4Y+1 |
| 4Y | 4Y | 4Y | 4Y | 4Y | 4Y |

| PIXEL POSITION k | l2 | l1 | c | r1 |
|---|---|---|---|---|
| DATA HDM(k) | 4Y | 4Y | 4Y+3 | 4Y+3 |
| DIFFERENCE DATA HED(k) | -3 | -3 | 0 | 0 |
| DECISION DATA HEE(k) | 1 | 1 | 1 | 1 |
| f{HED(k)} | -3 | -3 | 0 | 0 |

FIG.52

| 0 | 0 | 1  | -2 | -1 | 0 |
|---|---|----|----|----|---|
| 0 | 0 | 1  | -2 | -1 | 0 |
| 0 | 0 | 0  | -2 | -1 | 0 |
| 0 | 0 | 0  | -1 | 0  | 0 |
| 0 | 0 | 0  | -1 | 0  | 0 |
| 0 | 0 | 0  | 0  | 0  | 0 |

FIG.53

| 4Y | 4Y | 4Y+1 | 4Y+2 | 4Y+3 | 4Y+4 |
|----|----|------|------|------|------|
| 4Y | 4Y | 4Y+1 | 4Y+2 | 4Y+3 | 4Y+4 |
| 4Y | 4Y | 4Y   | 4Y+1 | 4Y+2 | 4Y+3 |
| 4Y | 4Y | 4Y   | 4Y+1 | 4Y+2 | 4Y+2 |
| 4Y | 4Y | 4Y   | 4Y   | 4Y+1 | 4Y+1 |
| 4Y | 4Y | 4Y   | 4Y   | 4Y   | 4Y   |

IMAGE PROCESSING APPARATUS AND METHOD AND IMAGE DISPLAY APPARATUS

BACKGROUND OF THE INVENTION

1. Field of the Invention

The present invention relates to an image processing apparatus, an image processing method, and an image display apparatus. In particular, it relates to methods of reducing the occurrence of false edges in a digital image by gray scale interpolation when the gray scale of a digital image is expanded by bit extension.

2. Description of the Related Art

In recent years, the brightness of the display screens of television sets and monitors has been increasing. As brightness increases, the amount of change in brightness per gray level in the gray scale increases. Ten-bit liquid crystal panels and other display devices with high gray-scale resolution are being developed, but digital television broadcasting uses an eight-bit gray scale, so despite the ten-bit resolution of the latest display devices, the effective resolution of the gray scale in a television picture remains eight bits. Not only does this prevent full utilization of the features of these new display devices; picture signals that should grade smoothly in color or brightness, such as pictures of a sunset or the surface of the sea, may instead grade in a staircase pattern, skipping one or more intermediate gray levels at each step and thereby producing visible false edges.

When only one level is skipped, the false edge can be eliminated by an averaging process. To deal with jumps between two gray levels that differ by N levels, where N is any integer greater than one, Japanese Patent Application Publication No. 10-84481 (Paras. 0002 to 0006 and 0025 to 0028, FIGS. 1 and 2) defines an interpolation region around the jump, separates the interpolation region into (N+1) discrete subregions, and assigns sequential gray levels to the subregions.

A general problem of such methods is that they fail to distinguish between true image edges and false edges caused by bit extension. If used to smooth out false edges, these methods also smooth out real edges, leading to a loss of sharpness, as if the picture were slightly out of focus.

SUMMARY OF THE INVENTION

An object of the present invention is to provide an image processing apparatus that eliminates false edges due to bit extension of image data without impairing the sharpness of real edges.

The invention provides an image processing apparatus comprising a bit extender and an edge-preserving smoothing filter. The bit extender receives n-bit image data, carries out an α-bit bit extension, and outputs resulting basic (n+α)-bit image data, where n and α are positive integers. The edge-preserving smoothing filter smoothes the basic (n+α)-bit image data by using the additional gray levels provided by the bit extension. The edge-preserving smoothing filter may be an epsilon filter with a threshold value $\epsilon$ equal to $2^\alpha$. Such a filter smoothes out jumps of $2^\alpha$ gray levels caused by the bit extension without smoothing out larger jumps, thereby eliminating false edges from regions of gradual change while preserving the sharpness of real edges.

The bit extender and the edge-preserving smoothing filter may be combined into a bit-extending edge-preserving smoothing filter.

The invention also provides an image display apparatus including the above image processing apparatus. One example is a television receiver that receives an eight-bit digital broadcast picture signal and displays a smooth, vivid, and sharp picture on a ten-bit display unit.

BRIEF DESCRIPTION OF THE DRAWINGS

In the attached drawings:

FIG. 14 is a table showing data generated by the four difference calculators, the four epsilon decision units, and the conditional weighted averager in the first embodiment;

FIGS. 16A to 16E are graphs illustrating the operation of the image display apparatus in FIG. 15;

FIG. 17 is a table showing data generated by the three difference calculators, the three epsilon-decision units, and the conditional weighted averager in FIG. 15;

FIGS. 19A to 19E are graphs illustrating the operation of the image display apparatus in FIG. 18;

FIGS. 25A and 25B illustrate the operation of the bit extender in the second embodiment;

FIG. 27 illustrates the output of the data storage unit in the second embodiment;

FIG. 28 illustrates the weighted average values EM corresponding to the image data DM in FIG. 23;

FIG. 29 illustrates the operation of the data adder in the second embodiment;

FIG. 30A and FIG. 30B illustrate the operation of the bit extender in the second embodiment;

FIG. 31 illustrates the output of the bit extender in the second embodiment;

FIG. 32 illustrates the weighted average values EM corresponding to the image data DM in FIG. 23;

FIGS. 42A and 42B illustrate the operation of the bit extender in the third embodiment;

FIG. 45 is a table summarizing the data generated by the four vertical difference calculators, the four vertical epsilon-decision units, and the vertical conditional weighted averager in FIG. 40;

FIG. 46 illustrates the weighted average data VEM corresponding to the image data VDM;

FIG. 47 illustrates the operation of the horizontal data adder in FIG. 41;

FIG. 48 illustrates the operation of the basic data storage unit in FIG. 41;

FIG. 49 is a table summarizing the data generated by the four basic data difference calculators and the four horizontal epsilon-decision units in FIG. 41;

FIG. 50 illustrates the operation of the horizontal data storage unit in FIG. 41;

FIG. 51 is a table summarizing the data HDM output by the horizontal data storage unit, the decision data HEE output by the four horizontal epsilon-decision units, and the corresponding data generated by the four basic data difference calculators and the horizontal conditional weighted averager in FIG. 41;

FIG. 52 illustrates the weighted average value HEM corresponding to the image data HDM;

FIG. 53 illustrates the operation of the horizontal data adder in FIG. 41;

DETAILED DESCRIPTION OF THE INVENTION

Figure 1:
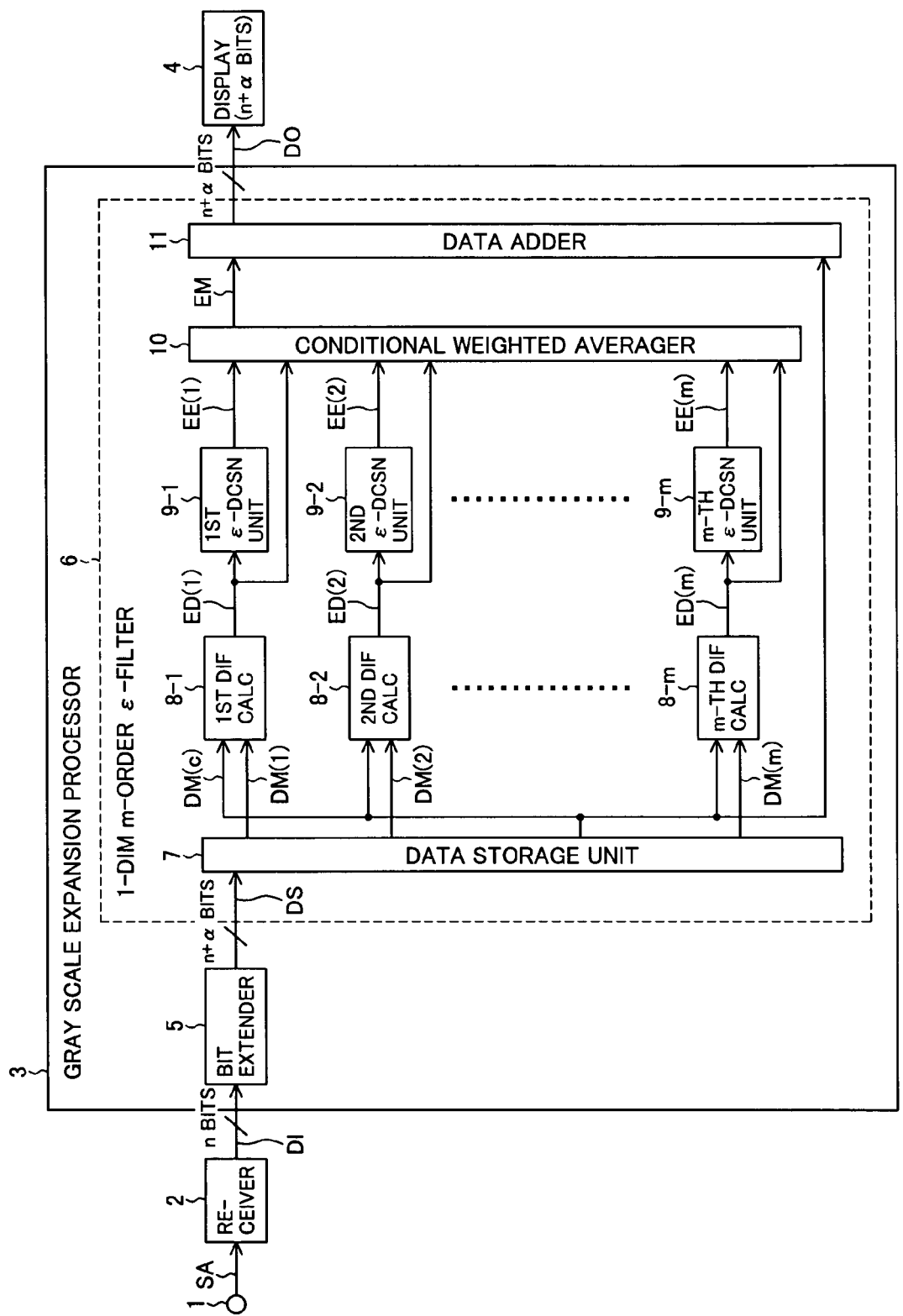
FIG. 1 is a block diagram illustrating the structure of the image display apparatus in a first embodiment of the present invention.

Embodiments of the invention will now be described with reference to the attached drawings, in which like elements are indicated by like reference characters.

First Embodiment

Referring to FIG. 1, the image display apparatus in the first embodiment of the invention comprises an input terminal 1, a receiver 2, a gray scale expansion processor 3, and a display unit 4. The receiver 2 and gray scale expansion processor 3 constitute the image processing apparatus.

In this embodiment, the receiver 2 will be described as an analog-to-digital converter for converting an analog image signal to n-bit digital image data, but this is not a restriction; the receiver 2 may include a tuner, in which a composite signal may be demodulated into luminance and chrominance signals and then converted to digital image data, or the receiver 2 may be a digital interface that receives digital data through the input terminal 1 and outputs n-bit image data DI.

An analog image signal SA is input from the input terminal 1 to the receiver 2, converted to n-bit image data DI, and output to the gray scale expansion processor 3. The gray scale expansion processor 3 converts the n-bit image data to $(n+\alpha)$-bit data, filters the data, and outputs the filtered data to the display unit 4. The gray scale expansion processor 3 includes a bit extender 5 and a one-dimensional m-order epsilon filter ($\epsilon$-filter) 6. The bit extender 5 outputs $(n+\alpha)$-bit image data obtained by extending the n-bit image data DI by a bits to the one-dimensional m-order epsilon filter 6.

The image data DS (and image data DI) represent the values of pixels arranged in a matrix; pixel position is represented by a pair of coordinates (i, j) with the origin (0, 0) at the upper left corner of the display; the value of increases in the horizontal direction in steps of one per column to the right; the value of j increases in the vertical direction in steps of one per one row downward. The image data DS thus represent a row-column matrix of data representing the values of the pixels aligned from top to bottom and from left to right on the display screen.

The conversion of the image signal SA to the image data DI in the receiver 2, the supplying of image data DI from the receiver 2 to the bit extender 5, the bit extension in the bit extender 5, the supply of the image data D from the bit extender 5 to the one-dimensional m-order epsilon filter 6, and the operation of the one-dimensional m-order epsilon filter 6 are synchronized with a pixel clock signal supplied by a control unit (not shown).

The one-dimensional m-order epsilon filter 6 is an edge-preserving smoothing filter that processes pixels aligned one-dimensionally so as to preserve large abrupt changes (edges) while smoothing out small abrupt changes as if they were noise. The one-dimensional m-order epsilon filter 6 in FIG. 1 includes a data storage unit 7, a plurality of difference calculators (DIF CALC) 8-1 to 8-$m$, a plurality of epsilon decision ($\epsilon$-DCSN) units 9-1 to 9-$m$, a conditional weighted averager 10, and a data adder 11. The one-dimensional m-order epsilon filter 6 eliminates gray scale jumps in the expanded gray scale produced by the bit extender 5, thereby increasing the number of effective gray scale levels in the output image data DO.

The image data DO are output to the display unit 4, which is capable of displaying (n+$\alpha$)-bit image data.

The epsilon filter is a known device described in, for example, *Hisenkei dijitaru shingo shori* (Non-linear signal processing) by Hinamoto et al., Asakura shoten, 1999, pp. 106-107 (in Japanese).

The one-dimensional processing by the epsilon filter is represented by equation (1), where x(i) indicates an input gray level, y(i) indicates an output gray level, $a_k$ is a coefficient, k indicates pixel position relative to the pixel of interest, and $\epsilon$ is a threshold value.

$$y(i) = x(i) + \sum_{k=-m/2+1}^{m/2} a_k f\{x(i-k) - x(i)\} \quad (1)$$

$$f(u) = \begin{cases} u & (u \leq \varepsilon) \\ 0 & (u > \varepsilon) \end{cases}$$

Figure 2:
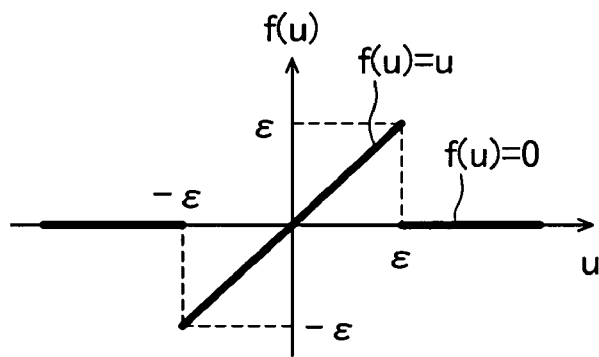
FIG. 2 is a graph illustrating the function f(u) in equation (1)

The function f(u) in equation (1) is represented by the graph in FIG. 2. When the absolute value of u is equal to or less than the threshold value $\epsilon$, f(u) equals u (f(u)=u); when the absolute value of u is greater than the threshold value $\epsilon$, f(u) equals zero (f(u)=0).

In the example above, u is equal to x(i−k)−x(i), that is, the difference between the gray level x(i) at pixel position i and the gray level x(i−k) at a pixel position (i−k) near pixel position i. When the difference x(i−k)−x(i) is small, f(u)=f{x(i−k)−x(i)} is the identity function, and if the sum of the coefficients $a_k$ is unity, equation (1) can be replaced with equation (2), which is the equation of a weighted-average filter.

$$y(i) = \sum_{k=-m/2+1}^{m/2} a_k x(i-k) \quad (2)$$

When the sum of the coefficients $a_k$ is unity, equation (1) can also be rewritten as equation (3).

$$y(i) = \sum_{k=-m/2+1}^{m/2} a_k [x(i) + f\{x(i-k) - x(i)\}] \quad (3)$$

$$= \sum_{k=-m/2+1}^{m/2} a_k x'(i-k)$$

The quantity x'(i−k) is defined by the expression in brackets in equation (3). From this expression and FIG. 2, when the difference x(i−k)−x(i) is equal to or less than the threshold value $\epsilon$, x'(i−k) is equal to x(i−k); when the difference x(i−k)−x(i) is greater than the threshold value $\epsilon$, x'(i−k) is equal to x(i), as in equation (4).

$$x'(i-k) = \begin{cases} x(i-k) & : |x(i-k) - x(i)| \leq \varepsilon \\ x(i) & : |x(i-k) - x(i)| > \varepsilon \end{cases} \quad (4)$$

Figure 3A:
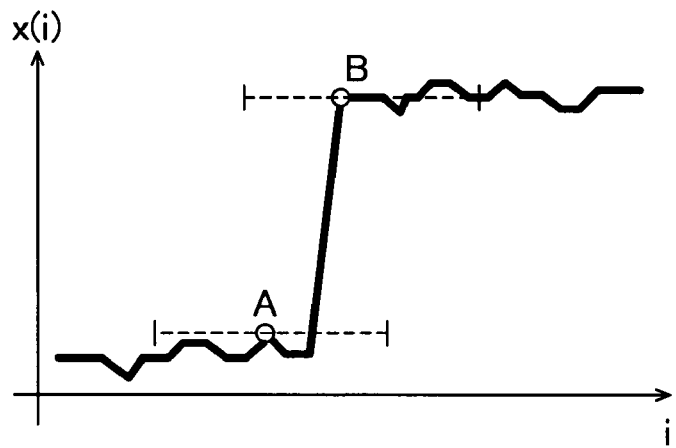
FIGS. 3A to 3C are graphs illustrating the operations of the epsilon filter.
Figure 3B:
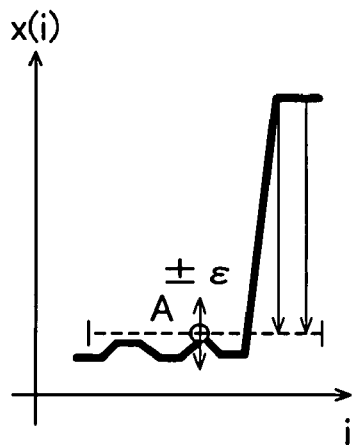
Figure 3C:
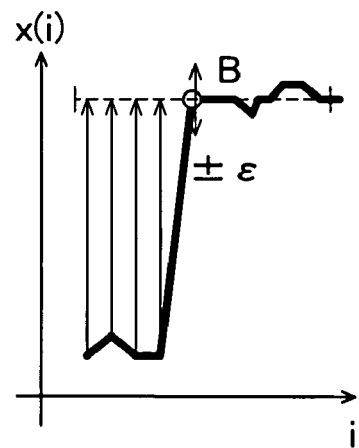

The operation of the epsilon filter will be described with reference to FIGS. 3A to 3C. FIG. 3A illustrates an input signal including a large abrupt change or edge; FIG. 3B illustrates the operation of the epsilon filter on this input signal at point A; FIG. 3C illustrates the operation at point B. The horizontal axis represents pixel position i; the vertical axis represents the gray level of the input x(i).

When the pixel at point A in FIG. 3A is processed, the epsilon filter takes the weighted average of the pixels in a neighborhood surrounding and including point A, first using the function in FIG. 2 to replace all gray levels that differ from the gray level at point A by more than ±$\epsilon$ with the gray level at point A, as shown in FIG. 3B. The weighted average therefore excludes the large-amplitude change at the nearby edge, and the value at point A is smoothed without being distorted by the edge. Similarly, when the edge pixel at point B is processed its value changes only slightly, because all values included in the weighted average are within $\epsilon$ of the value at the edge, as shown in FIG. 3C. Therefore, the sharpness of the edge is not lost. The epsilon filter can accordingly smooth out low-level noise and other minor changes in the data while retaining large abrupt signal changes at edges and similar features.

In this embodiment, the epsilon filter is designed to treat jumps caused by the bit extension process as noise. That is, when n-bit data are extended to (n+$\alpha$)-bit data, the threshold value $\epsilon$ is set equal to $2^\alpha$. This enables the epsilon filter to increase the number of effective gray levels while retaining abrupt changes at edges and other such points in an image.

The case in which $\alpha$ equals two ($\alpha$=2), so that n-bit image data are expanded to (n+2)-bit image data, will now be described with reference to FIG. 4.

Figure 4:
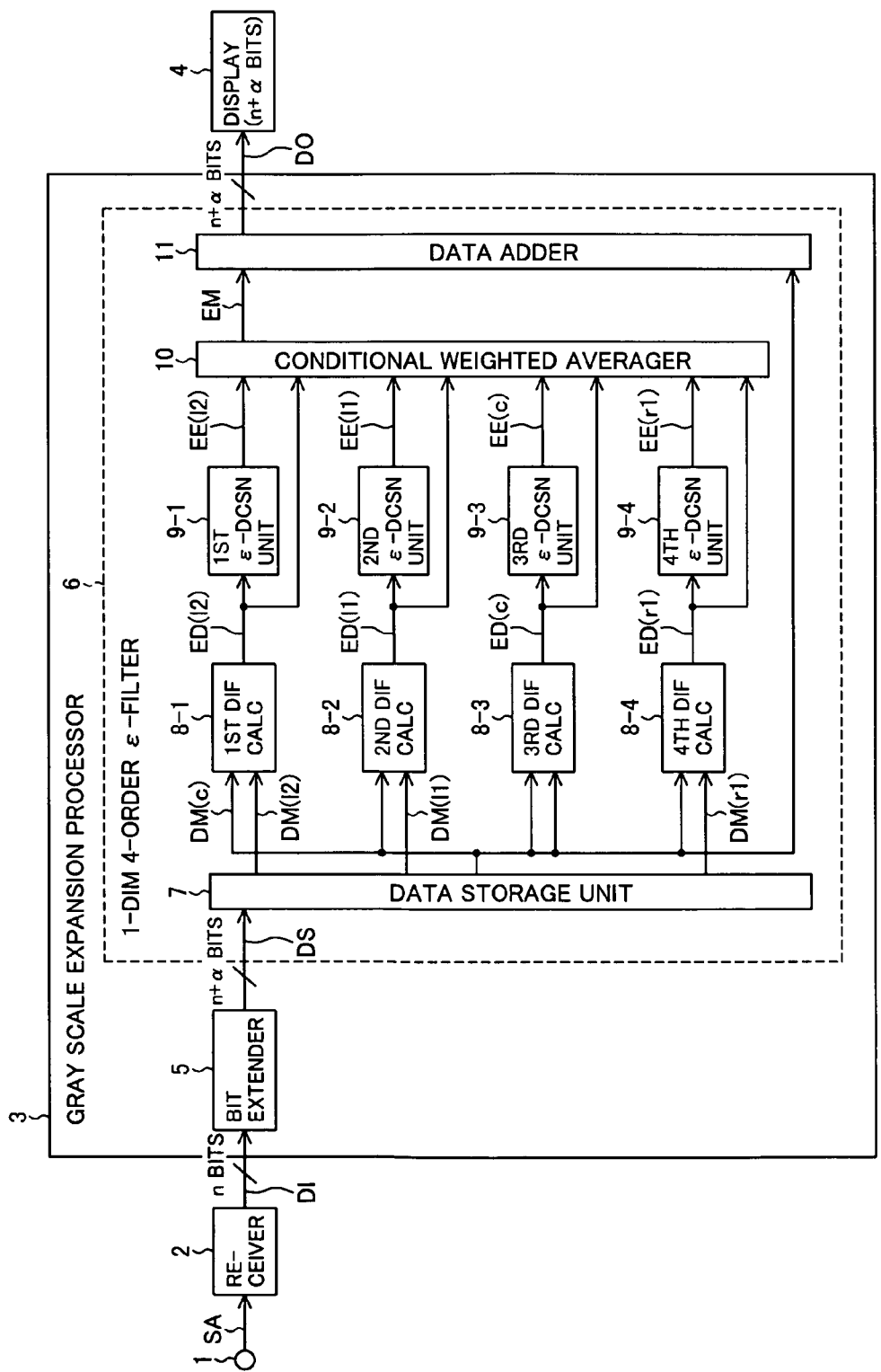
FIG. 4 is a block diagram illustrating the structure of the image display apparatus in the first embodiment when n-bit image data are extended to (n+2)-bit image data.

In FIG. 1, the data input to the difference calculators 8-1 to 8-$m$ are denoted DM(1) to DM(m), while in FIG. 4, the data input to the calculators 8-1 to 8-4 are denoted DM(l2), DM(l1), DM(c), DM(r1), which are the same as DM(1), DM(2), DM(3), DM(4) when m equals four (m=4). Likewise, the output signals of the difference calculators 8-1 to 8-4 will be denoted ED(l2), ED(l1), ED(c), ED(r1) and sometimes referred to as ED(l2) to ED(r1), and the output signals of the epsilon decision units 9-1 to 9-4 will be denoted EE(l2), EE(l1), EE(c), EE(r1), and referred to as EE(l2) to EE(r1).

Figure 5A:
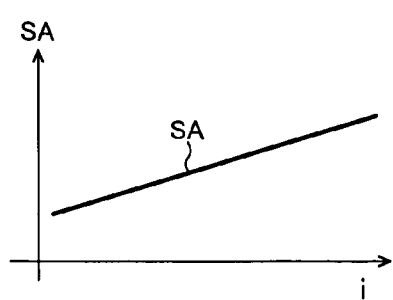
FIGS. 5A and 5B are graphs illustrating the operation of the receiver in the first embodiment.
Figure 5B:
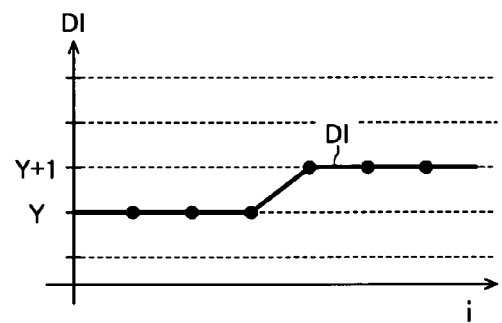

The operation of the receiver 2 will be described with reference to FIGS. 5A and 5B, in which the horizontal axis represents pixel position. FIG. 5A illustrates the waveform of the analog image signal SA; FIG. 5B illustrates the corresponding values of the digital image data DI. The analog image signal SA shown in FIG. 5A is input through the input terminal 1 to the receiver 2. The receiver 2 converts the analog image signal SA to n-bit image data DI and outputs these data DI to the gray scale expansion processor 3, more specifically to the bit extender 5.

The image signal SA shown in FIG. 5A has a gradually rising gray level, but because the quantization resolution is low (n is small), the signal is converted to the two gray levels (Y and Y+1) in the image data DI shown in FIG. 5B.

Figure 6A:
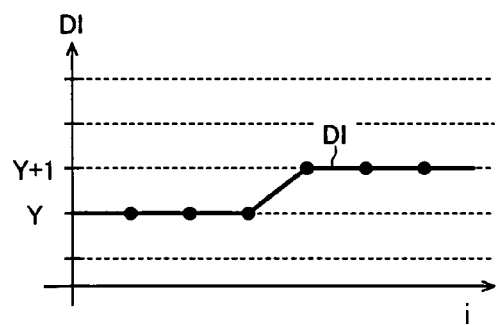
FIGS. 6A and 6B are graphs illustrating the operation of the bit extender in the first embodiment.
Figure 6B:
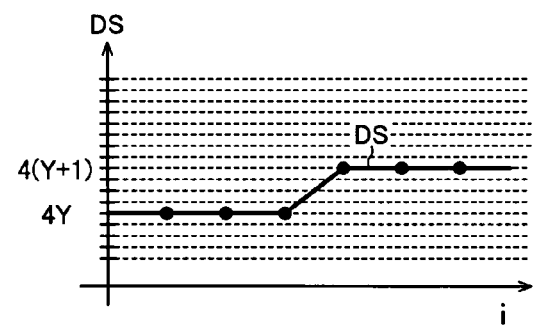

FIG. 6A shows the gray levels of the n-bit image data DI; FIG. 6B shows the gray levels of the (n+2)-bit image data DS. The bit extender 5 carries out a two-bit extension of the n-bit image data DI shown in FIG. 6A and outputs the (n+2)-bit image data DS shown in FIG. 6B to the one-dimensional m-order epsilon filter 6. Since a two-bit extension is equivalent to multiplication by four, the gray levels Y and Y+1 of the image data DI in FIG. 6A are converted to 4Y and 4(Y+1), respectively.

Figure 7:
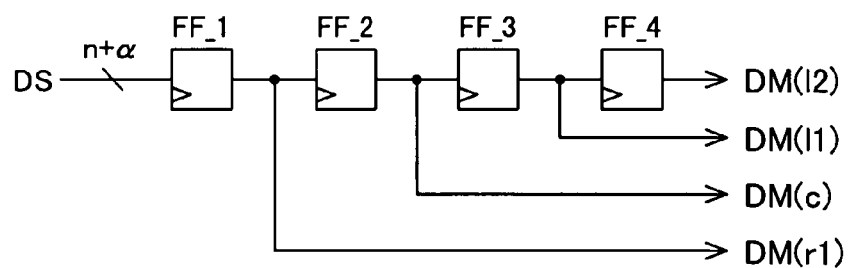
FIG. 7 illustrates an exemplary structure of the data storage unit in the first embodiment.

The data storage unit 7 in FIG. 4 is configured as shown in FIG. 7, for example, using four cascaded flip-flops FF_1 to FF_4 that operate in synchronization with the pixel clock. The input image data DS are transferred through the four flip-flops so that a pixel value is held in each of the four flip-flops FF_1, FF_2, FF_3, FF_4 for one clock period in turn. As a result, the data for four consecutive input pixels are held simultaneously in and output simultaneously from the four flip-flops FF_1 to FF_4.

More specifically, the data held by flip-flop FF_2 are output as the gray level DM(c) of the pixel of interest c; the data held by flip-flop FF_3 are output as the gray level DM(l1) of the pixel l1 immediately preceding the pixel of interest c, that is, the first adjacent pixel to the left of pixel c (with a difference of one in the horizontal coordinate value i); the data held by flip-flop FF_4 are output as the gray level DM(l2) of the pixel l2 preceding pixel l1, that is, the second pixel to the left of the pixel of interest (with a difference of two in the horizontal coordinate value i); the data held by flip-flop FF_1 are output as the gray level DM(r1) of the pixel r1 immediately following the pixel of interest c, that is, the first adjacent pixel to the right of pixel c (with a difference of one in the horizontal coordinate value i).

Figures 8, 9:
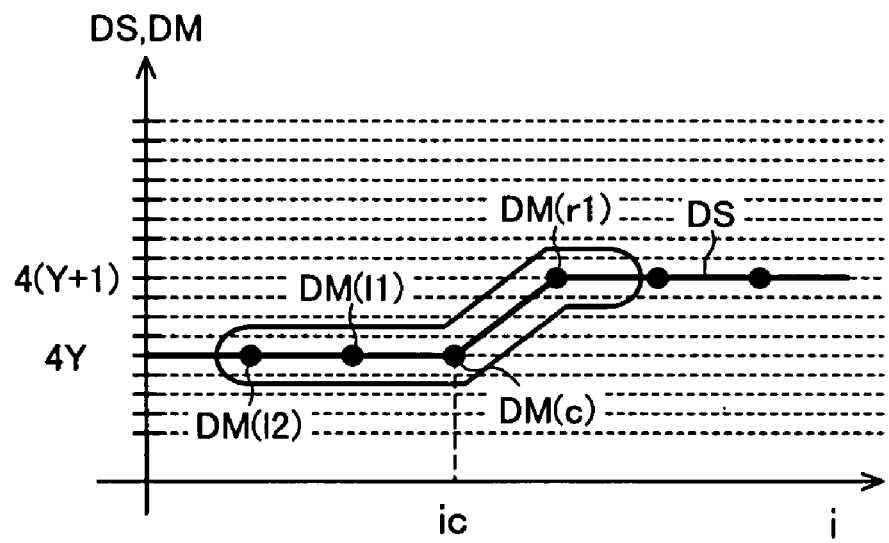
FIG. 8 is a graph illustrating the output of the data storage unit in the first embodiment.
FIG. 9 is a table summarizing the data generated by the four difference calculators, the four epsilon decision units, and the conditional weighted averager in FIG. 4.

The operation of the data storage unit 7 is illustrated in FIG. 8, in which the horizontal axis represents pixel position i and the vertical axis represents the gray level of the image data DS input to the data storage unit 7 and the image data DM output from the data storage. In the example shown in the graph, the data storage unit 7 outputs DM(l2)=4Y, DM(l1)=4Y, DM(c)=4Y, and DM(r1)=4Y+4 to the difference calculators 8-1 to 8-4. In this way, the data storage unit 7 simultaneously outputs the image data DM(c) of the pixel of interest at pixel position ic together with image data DM(l2), DM(l1), and DM(r1) of pixels positioned near the pixel of interest.

The first difference calculator 8-1 in FIG. 4 generates the difference ED(l2) between the gray level DM(l2) of pixel l2 and the gray level DM(c) of the pixel of interest c and outputs the difference data to the first epsilon decision unit 9-1 and the conditional weighted averager 10. Similarly, difference calculators 8-2 to 8-4 generate difference data ED(l1), ED(c), ED(r1) from the gray levels DM(l1), DM(c), and DM(r1) and output the generated difference data to epsilon decision units 9-2 to 9-4 and the conditional weighted averager 10. ED(c) is always zero. ED(l2), ED(l1), and ED(r1) represent the differences in gray level between the pixel of interest and three neighboring pixels.

FIG. 9 shows the data DM(k) output from the data storage unit 7, the corresponding difference data ED(k) generated by the difference calculators 8-1 to 8-4, the decision data generated by the epsilon decision units 9-1 to 9-4, and the value EM generated by the conditional weighted averager 10, together with the value f{ED(k)} obtained in the operation of the conditional weighted averager 10.

The output of the first difference calculator 8-1 is:

ED(l2)=DM(l2)−DM(c)=4Y−4Y=0

The output of the second difference calculator 8-2 is:

ED(l1)=DM(l1)−DM(c)=4Y−4Y=0

The output of the third difference calculator 8-3 is:

ED(c)=DM(c)−DM(c)=4Y−4Y=0

The output of the fourth difference calculator 8-4 is:

ED(r1)=DM(r1)−DM(c)=(4Y+4)−4Y=4

Figure 10A:
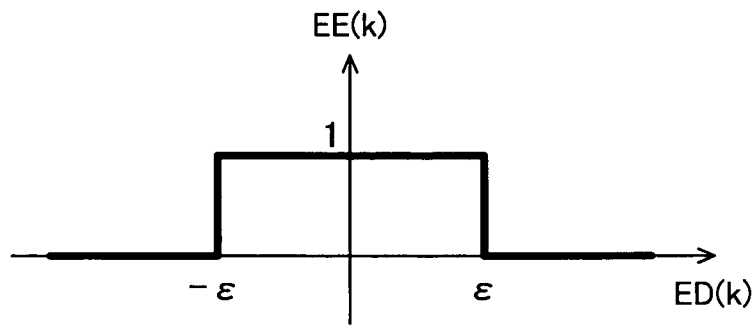
FIGS. 10A and 10B are graphs illustrating the operation of the four epsilon decision units and the conditional weighted averager in FIG. 4.

The epsilon decision units 9-1 to 9-4 receive the difference values ED(k), decide whether each value is greater than ϵ or not, and output the decision results as the decision data EE(k) shown in FIG. 10A to the conditional weighted averager 10. When the difference value ED(k) is greater than ϵ, the decision value EE(k) is zero ('0'); when the difference value ED(k) is equal to or less than ϵ, the decision value EE(k) is one ('1').

The first epsilon decision unit 9-1 thus generates '0' output when the difference ED(l2) is greater than ϵ, and generates '1' output when the difference ED(l2) is equal to or less than the ϵ.

Epsilon decision units 9-2 to 9-4 generate similar decision data EE(l1) to EE(r1) based on the difference data ED(l1) to ED(r1). The generated decision data are supplied to the conditional weighted averager 10. In this example, since a equals two (α=2), the threshold value ϵ is set to four (ϵ=4).

In the example shown in FIG. 9, zero (0) is input to epsilon decision units 9-1, 9-2, and 9-3 as difference data ED(l2), ED(l1), and ED(c); four (4) is input to the second epsilon decision unit 9-4 as difference data ED(r1). The difference data ED(l2) to ED(r1) are all equal to or less than ϵ, so the decision data EE(l2) to EE(r1) are all '1'.

Figure 10B:
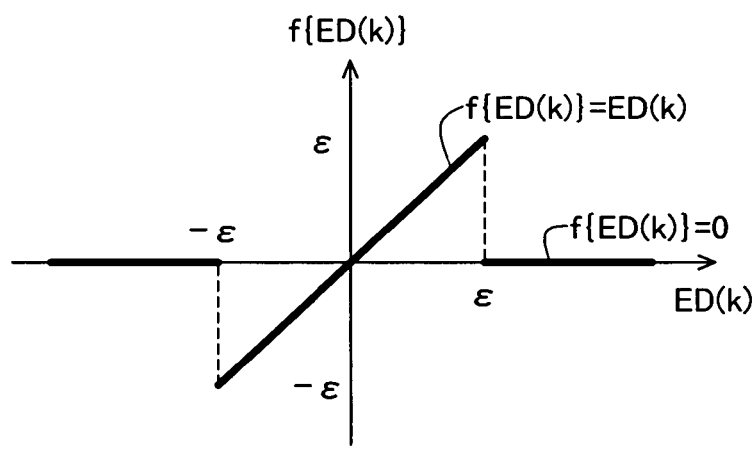

The conditional weighted averager 10 calculates the weighted average of the difference data ED(l2) to ED(r1) conditional on the decision data EE(l2) to EE(r1) and outputs the resulting weighted average value. When the decision data are '1', the difference data are multiplied by respective coefficients $a_k$ and the products are summed; when the decision data are '0', the products are not included in the sum. In effect, the conditional weighted averager 10 transforms the difference data ED(k) according to the function f{ED(k)} shown in FIG. 10B and then takes the weighted average.

If the coefficients $a_k$ ($a_{l2}$, $a_{l1}$, $a_c$, $a_{r1}$) are all one-fourth (0.25), then since the decision data EE(l2) to EE(r1) are all '1', the output EM of the conditional weighted averager 10 is given by equation (5).

$$EM = a_{l2} \times ED(l2) + a_{l1} \times ED(l1) + a_c \times ED(c) + a_{r1} \times ED(r1) \quad (5)$$
$$= 0.25 \times 0 + 0.25 \times 0 + 0.25 \times 0 + 0.25 \times 4$$
$$= 1$$

The above processing is carried out sequentially on the image data DS supplied from the bit extender 5, each pixel becoming the pixel of interest in turn, so an operation similar to equation (5) is carried out for each successive pixel.

Figure 11:
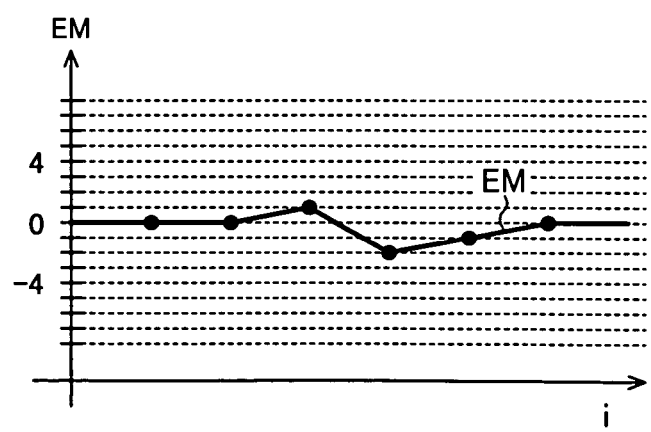
FIG. 11 is a graph showing the weighted average value EM corresponding to the image data DM.

FIG. 11 shows the weighted average value EM output for each pixel in the image data DM in FIG. 8. The horizontal axis in FIG. 11 represents the position i of the pixel of interest; the vertical axis represents the weighted average gray level difference EM. The conditional weighted averager 10 outputs the weighted average EM to the data adder 11.

Figure 12A:
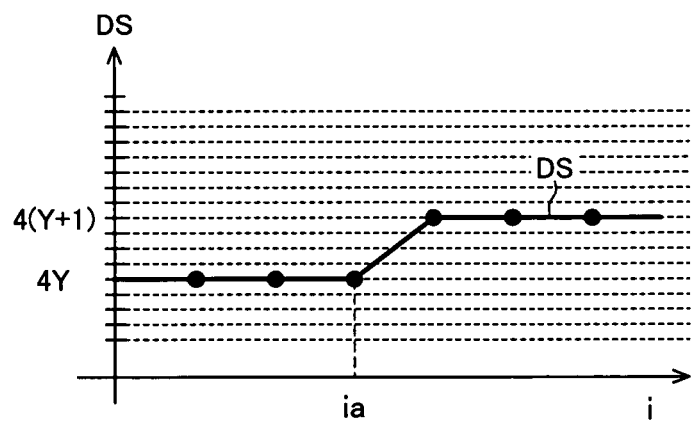
FIGS. 12A to 12C are graphs illustrating the operation of the data adder in the first embodiment.
Figure 12B:
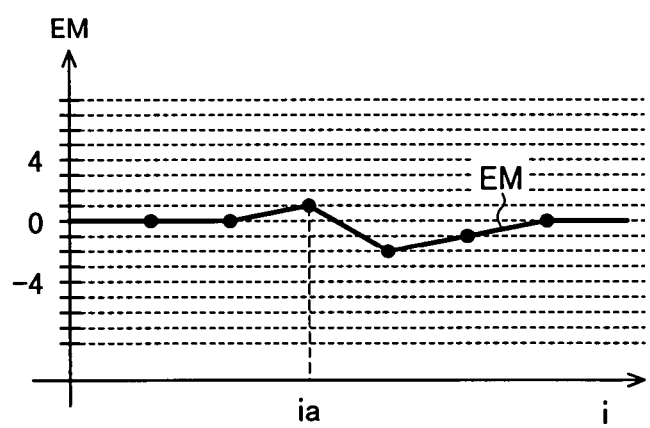
Figure 12C:
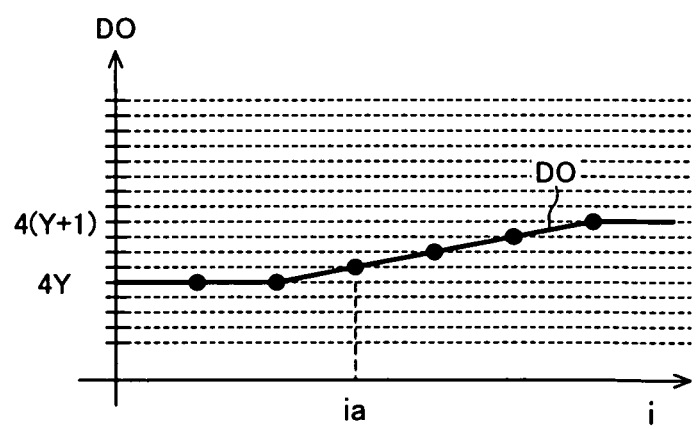

The operation of the data adder 11 will now be described with reference to FIGS. 12A to 12C. FIG. 12A shows the gray level of the image data DS; FIG. 12B shows the weighted average gray level difference value EM; FIG. 12C shows the gray level of the output image data DO. The data adder 11 adds the image data DS shown in FIG. 12A to the weighted average EM shown in FIG. 12B and outputs the image data DO shown in FIG. 12C. For example, at pixel position ia in FIGS. 12A to 12C, DS(ia)=4Y and EM(ia)=1, so the output value DO(ia) is:

DO(ia)=DS(ia)+EM(ia)=4Y+1

As described above, this embodiment can increase the number of effective gray levels in a region with gradually changing gray levels. When n-bit image data are converted to (n+2)-bit image data, if the analog image signal SA changes gradually and the gray level of the bit-extended image data DS jumps from 4Y to (4Y+4), changing abruptly by four gray levels (4=2²) as shown in FIG. 12A, gray levels with levels of (4Y+1), (4Y+2), and (4Y+3) are interpolated to smooth out the jump as shown in FIG. 12C.

Figure 13D:
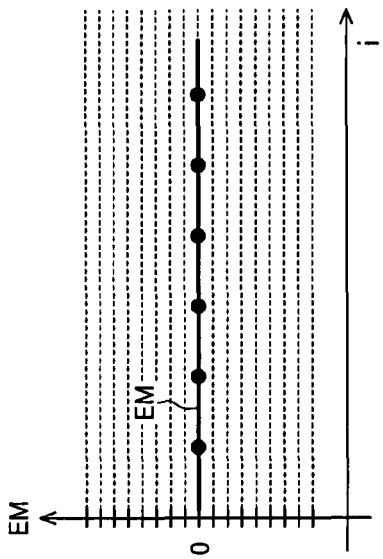
FIGS. 13A to 13E are graphs illustrating operations when a signal with a large abrupt change in gray level is input to the image display apparatus in the first embodiment.
Figure 13E:
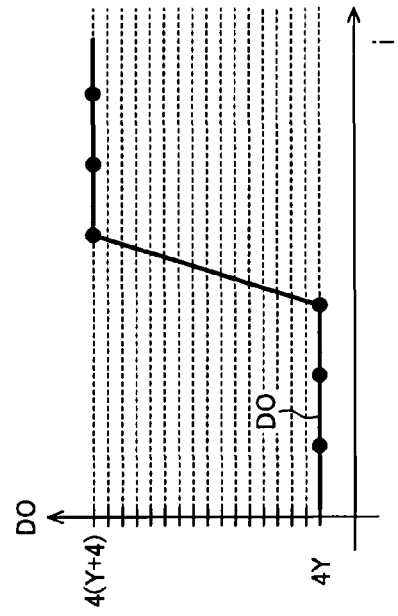
Figure 13A:
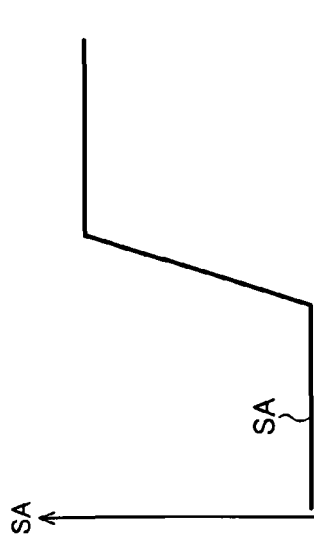
Figure 13B:
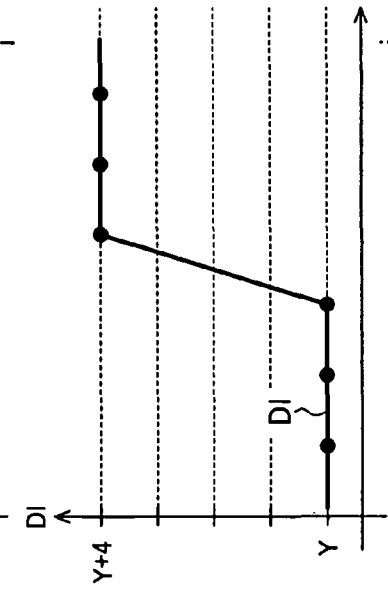
Figure 13C:
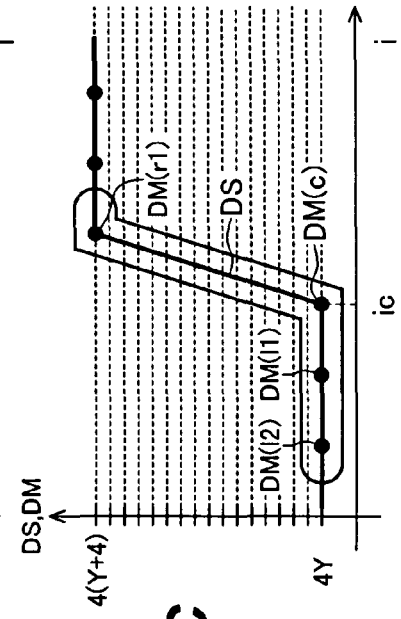

The operation when the epsilon filter receives a signal with a large jump in gray level will now be described with reference to FIGS. 13A to 13E. In these figures, the horizontal axis represents pixel position i and the vertical axis indicates gray level. FIG. 13A shows the analog image signal SA; FIG. 13B shows the n-bit image data DI; FIG. 13C shows the (n+α)-bit image data DS and DM; FIG. 13D shows the weighted average data EM; FIG. 13E show the (n+α)-bit output image data DO.

The analog image signal SA illustrated in FIG. 13A is input through the input terminal 1 to the receiver 2. The receiver 2 converts SA to n-bit digital image data DI expressing two gray levels (Y and Y+4) as shown in FIG. 13B and outputs the result to the bit extender 5.

The bit extender 5 converts the gray level Y in the image data DI in FIG. 13B to 4Y, converts gray level (Y+4) to 4(Y+4), and outputs the image data DS shown in FIG. 13C to the one-dimensional m-order epsilon filter 6.

FIG. 14 shows the data DM(k) output by the data storage unit 7 when the pixel at pixel position ic in FIG. 13C is the pixel of interest P(c), and the corresponding data ED(k) generated by the difference calculators 8-1 to 8-4, data EE(k) generated by the epsilon decision units 9-1 to 9-4, and data EM generated by the conditional weighted averager 10, together with the values of f{EK(k)} obtained in the operation of the conditional weighted averager 10.

The data storage unit 7 outputs DM(l2)=4Y, DM(l1)=4Y, DM(c)=4Y, and DM(r1)=4Y+16 to the difference calculators 8-1 to 8-4.

The output of the first difference calculator 8-1 is:

$$ED(l2)=DM(l2)-DM(c)=4Y-4Y=0$$

The output of the second difference calculator 8-2 is:

$$ED(l1)=DM(l1)-DM(c)=4Y-4Y=0$$

The output of the third difference calculator 8-3 is:

$$ED(c)=DM(c)-DM(c)=4Y-4Y=0$$

The output of the fourth difference calculator 8-4 is:

$$ED(r1)=DM(r1)-DM(c)=(4Y+16)-4Y=16.$$

Accordingly, zero (0) is input to the epsilon decision units 9-1 to 9-3 and sixteen (16) is input to the second epsilon decision unit 9-4. If the threshold value $\epsilon$ is equal to four ($\epsilon$=4), since ED(l2), ED(l1), and ED(c) are equal to or less than $\epsilon$, the corresponding decision data EE(l2), EE(l1), and EE(c) are '1'; since ED(r1) is greater than $\epsilon$, EE(r1) is '0'.

The conditional weighted averager 10 multiplies the difference data having decision data of '1' by coefficients $a_k$ and sums the results, excluding difference data with decision data of '0' from the sum.

If the coefficients $a_k$ ($a_{l2}$, $a_{l1}$, $a_c$, $a_{r1}$) are all one-fourth (0.25), then since only the decision data EE(l2), EE(l1), and EE(r1) are '1', the output EM of the conditional weighted averager 10 is given by equation (5).

$$EM = a_{l2} \times ED(l2) + a_{l1} \times ED(l1) + a_c \times ED(c) \quad (6)$$
$$= 0.25 \times 0 + 0.25 \times 0 + 0.25 \times 0$$
$$= 0$$

The above processing is carried out sequentially on the image data DS supplied from the bit extender 5, each pixel becoming the pixel of interest in turn, so an operation similar to equation (6) is carried out for each successive pixel.

FIG. 13D shows the weighted average value EM output for each pixel in the image data DM in FIG. 13C. The horizontal axis in FIG. 13D represents the position i of the pixel of interest; the vertical axis represents the weighted average gray level EM. The conditional weighted averager 10 outputs the weighted average EM to the data adder 11.

The data adder 11 adds the image data DS shown in FIG. 13C to the weighted average data EM shown in FIG. 13D and outputs the image data DO shown in FIG. 13E.

As shown in FIG. 13E, the output image data DO include an abrupt change similar to the abrupt change in the input signal SA and image data DI, demonstrating that the epsilon filter preserves the sharpness of large abrupt changes in gray level.

As described above, when n-bit image data are extended to (n+α)-bit data, if changes in lower a bits are treated as small-amplitude noise and the threshold value $\epsilon$ is set equal to $2^\alpha$, gray level jumps due to the difference in bit resolution between the input and output image are eliminated by increasing the number of gray levels represented in regions with gradually changing gray levels, while the sharpness of the image is preserved by leaving larger jumps unchanged. That is, the number of effective gray levels is increased without blurring the image.

Figure 15:
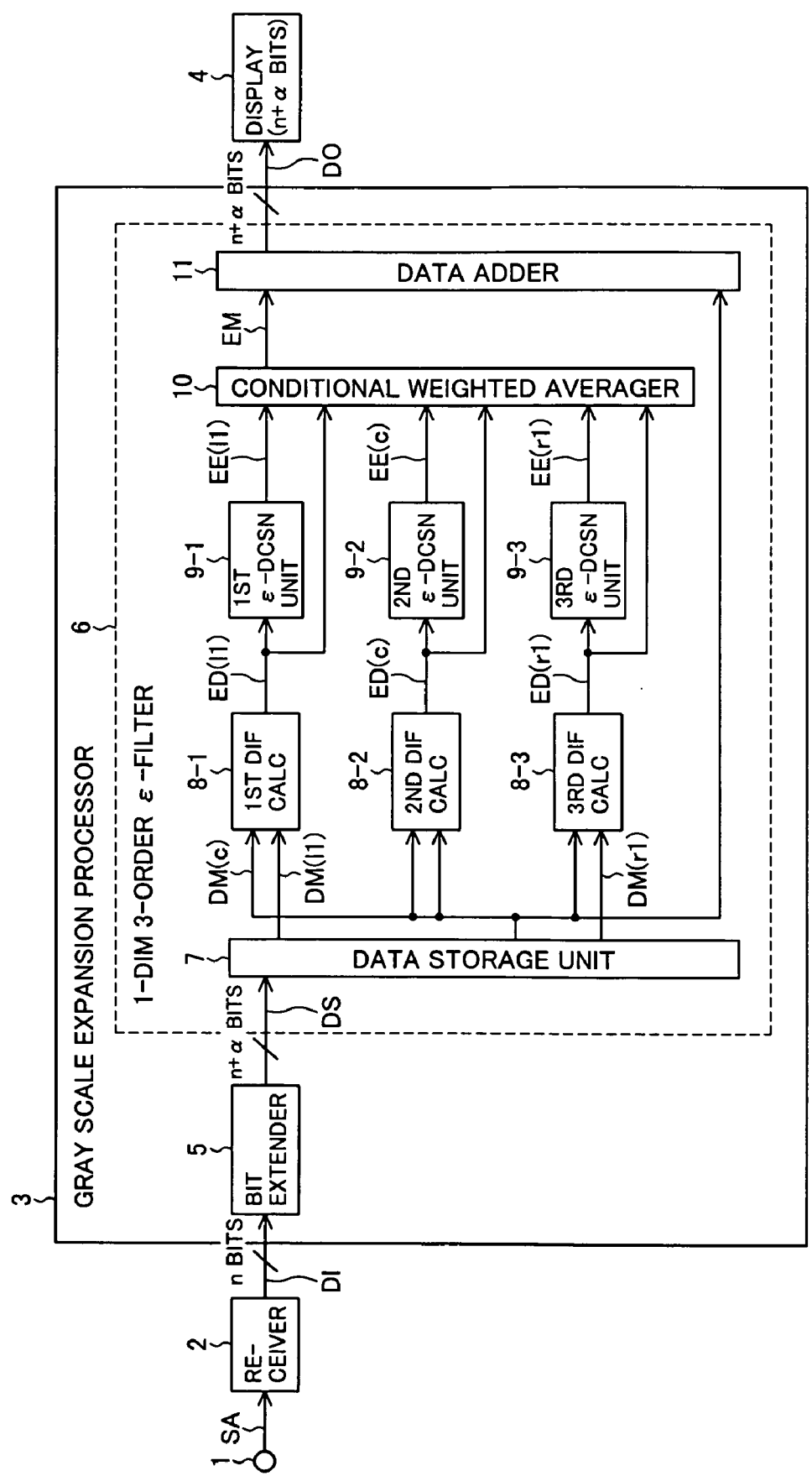
FIG. 15 is a block diagram illustrating the structure of the image display apparatus in the first embodiment when m equals three.

In the above example, the order m of the epsilon filter is set equal to $2^\alpha$. This is not a limitation, but the use of values of m less than $2^\alpha$ raises the problem described below, so m is preferably equal to or greater than $2^\alpha$. The case where m equals $2^\alpha-1$, a equals two, and accordingly m equals three (m=$2^\alpha-1$, α=2, m=3) will now be described. FIG. 15 illustrates an exemplary structure of the image display apparatus in the first embodiment when m equals three.

The operation of the image display apparatus in FIG. 15 will be described with reference to FIGS. 16A to 16E. The horizontal axis represents pixel position i and the vertical axis indicates gray level. FIG. 16A shows the analog image signal SA; FIG. 16B shows the n-bit image data DI; FIG. 16C shows the (n+2)-bit image data DS and DM; FIG. 16BD shows the weighted average data EM; FIG. 16E shows the (n+2)-bit output image data DO.

The analog image signal SA illustrated in FIG. 16A is input through the input terminal 1 to the receiver 2. The receiver 2 converts SA to n-bit digital image data DI expressing two gray levels (Y and Y+1) as shown in FIG. 16B and outputs the result to the bit extender 5.

The bit extender 5 converts the gray level Y in the image data DI in FIG. 16B to 4Y, converts gray level (Y+1) to 4(Y+1), and outputs the image data DS shown in FIG. 16BC to the one-dimensional m-order epsilon filter 6.

FIG. 17 shows the data DM(k) output by the data storage unit 7 when the pixel at pixel position ic in FIG. 16BC is the pixel of interest P(c), and the corresponding data ED(k) generated by the difference calculators 8-1 to 8-3, data EE(k) generated by the epsilon decision units 9-1 to 9-3, and data EM generated by the conditional weighted averager 10, together with the values of f{EK(k)} obtained in the operation of the conditional weighted averager 10.

The data storage unit 7 in FIG. 15 has a configuration similar to that in FIG. 7 but using only three cascaded flip-flops, and outputs DM(l1)=4Y, DM8(c)=4Y, DM(r1)=4Y+4 to the difference calculators 8-1 to 8-3.

The output of the first difference calculator 8-1 is:

$$ED(l1)=DM(l1)-DM(c)=4Y-4Y=0$$

The output of the second difference calculator 8-2 is:

$$ED(c)=DM(c)-DM(c)=4Y-4Y=0$$

The output of the third difference calculator 8-3 is:

$$ED(r1)=DM(r1)-DM(c)=(4Y+4)-4Y=4$$

Accordingly, zero (0) is input to the epsilon decision units 9-1 to 9-2 and four (4) is input to the third epsilon decision unit 9-3. If the threshold value $\epsilon$ is equal to four ($\epsilon=4$), then ED(l1), ED(c), and ED(r1) are all equal to or less than the threshold value $\epsilon$, and the decision data EE(l1), EE(c), and EE(r1) are all '1'.

The conditional weighted averager 10 multiplies the difference data having decision data of '1' by coefficients $a_k$ and sums the results, excluding difference data with decision data of '0' from the sum.

If the coefficients $a_k$ ($a_{l2}$, $a_c$, $a_{r1}$) are all one-third (approximated as 0.3325), then the output EM of the conditional weighted averager 10 is given by equation (7).

$$EM = a_{l1} \times ED(l1) + a_c \times ED(c) + a_{r1} \times ED(r1) \qquad (7)$$
$$= 0.3325 \times 0 + 0.3325 \times 0 + 0.3325 \times 4$$
$$\approx 1.33$$

The above processing is carried out sequentially on the image data DS supplied from the bit extender 5, each pixel becoming the pixel of interest in turn, so an operation similar to equation (7) is carried out for each successive pixel.

The data adder 11 adds the image data DS shown in FIG. 16BC to the weighted average data EM shown in FIG. 16BD and outputs the image data DO shown in FIG. 16E.

As described above, when n-bit image data are extended to (n+2)-bit data, producing gray level jumps of size 22 from 4Y to (4Y+4) in regions with gradually changing gray levels, a third-order epsilon filter (m=3) cannot produce the middle gray level (4Y+2), leaving a gap between gray levels (4Y+1) and (4Y+3), resulting in insufficient smoothing.

Therefore, it is necessary to set the number of taps of the epsilon filter to $2^\alpha$ or more (m$\geq 2^\alpha$).

The operation of an eighth-order order epsilon filter (m=8), shown in FIG. 18, will now be described with reference to FIGS. 19A to 19E, in which the horizontal axis represents pixel position i and the vertical axis indicates gray level. FIG. 19A shows the analog image signal SA; FIG. 19B shows the n-bit image data DI; FIG. 19C shows the bit-extended (n+$\alpha$)-bit image data DS and DM; FIG. 19D shows the weighted average values EM; FIG. 19E shows the output (n+$\alpha$)-bit image data DO.

The analog image signal SA illustrated in FIG. 19A is input through the input terminal 1 to the receiver 2. The receiver 2 converts SA to n-bit digital image data DI expressing two gray levels (Y and Y+1) as shown in FIG. 19B and outputs these data DI to the bit extender 5.

The bit extender 5 converts the gray level Y in the image data DI in FIG. 19B to 4Y, converts gray level (Y+1) to 4(Y+1), and outputs the image data DS shown in FIG. 19C to the one-dimensional m-order epsilon filter 6.

Figures 20, 21:
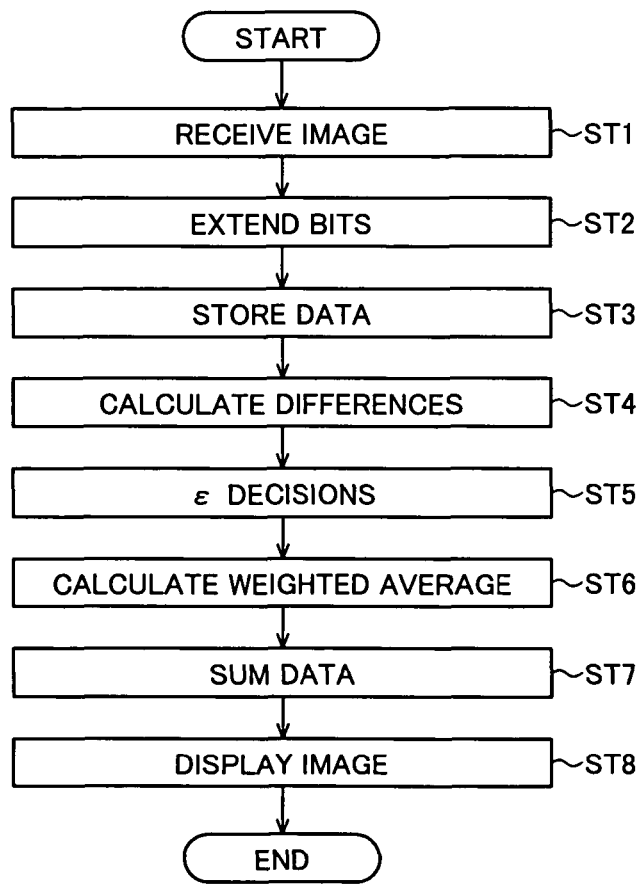
FIG. 20 is a table showing data generated by the eight difference calculators, the eight epsilon-decision units, and the conditional weighted averager in FIG. 18.
FIG. 21 is a flowchart illustrating the processing carried out by the image display apparatus in the first embodiment.

FIG. 20 shows data DM(k) output by the data storage unit 7 when the pixel at pixel position ic in FIG. 19C is the pixel of interest P(c), and the corresponding data ED(k) generated by the difference calculators 8-1 to 8-8, data EE(k) generated by the epsilon decision units 9-1 to 9-8, and data EM generated by the conditional weighted averager 10, together with the values of f{EK(k)} obtained in the operation of the conditional weighted averager 10.

Figure 18:
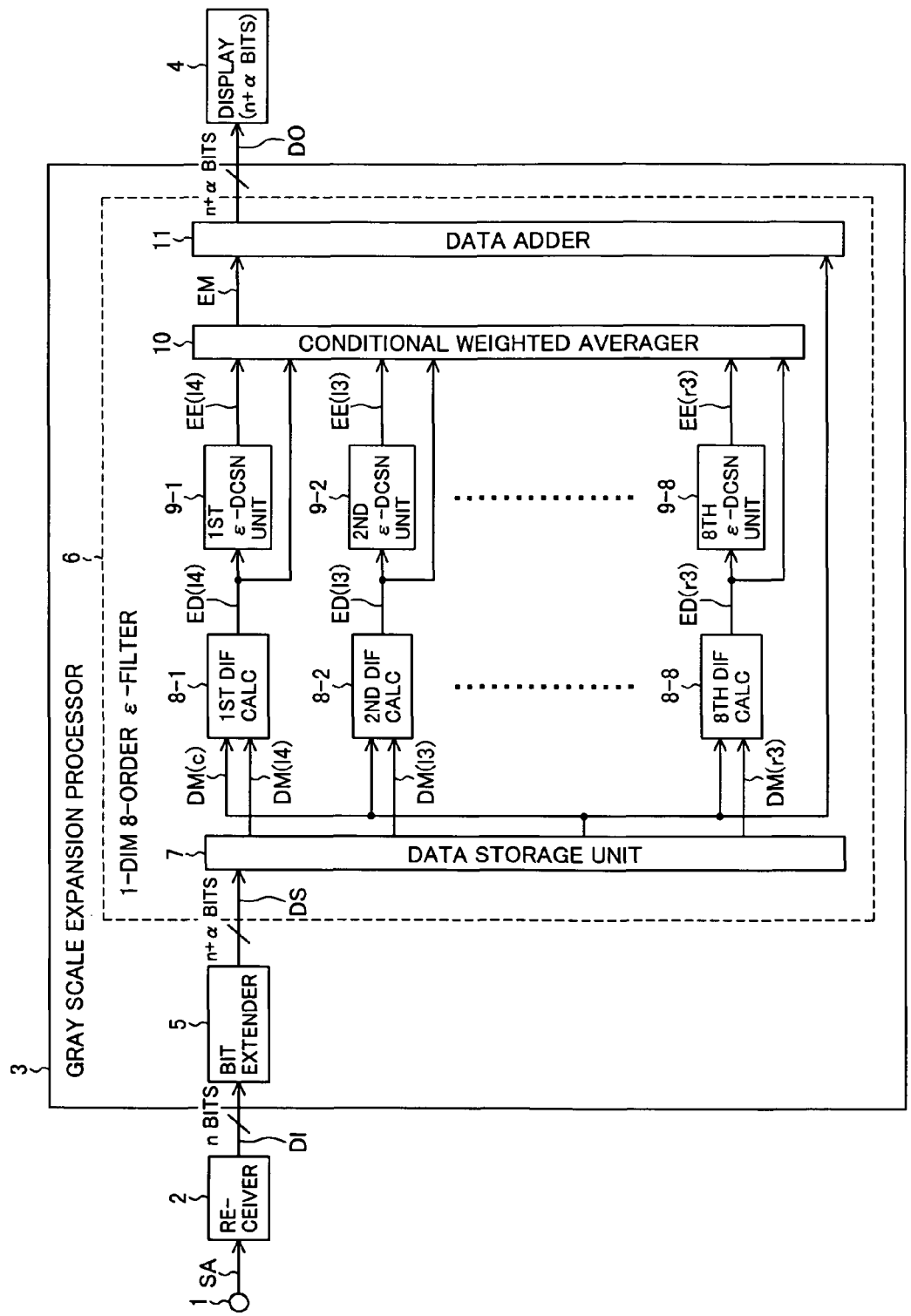
FIG. 18 is a block diagram illustrating the structure of the image display apparatus in the first embodiment when m equals eight.

The data storage unit 7 in FIG. 18 has a configuration similar to that in FIG. 7 but uses eight cascaded flip-flops and outputs DM(l4)=4Y, DM(l3)=4Y, DM(l2)=4Y, DM(c)=4Y, DM(r1)=4Y+4, DM(r2)=4Y+4, DM(r3)=4Y+4 to the difference calculators 8-1 to 8-8.

The output of the first difference calculator 8-1 is:

$$ED(l4)=DM(l4)-DM(c)=4Y-4Y=0$$

The output of the second difference calculator 8-2 is:

$$ED(l3)=DM(l3)-DM(c)=4Y-4Y=0$$

The output of the third difference calculator 8-3 is:

$$ED(l2)=DM(l2)-DM(c)=4Y-4Y=0$$

The output of the fourth difference calculator 8-4 is:

$$ED(l1)=DM(l1)-DM(c)=4Y-4Y=0$$

The output of the fifth difference calculator 8-5 is:

$$ED(c)=DM(c)-DM(c)=4Y-4Y=0$$

The output of the sixth difference calculator 8-6 is:

$$ED(r1)=DM(r1)-DM(c)=(4Y+4)-4Y=4$$

The output of the seventh difference calculator 8-7 is:

$$ED(r2)=DM(r2)-DM(c)=(4Y+4)-4Y=4$$

The output of the eighth difference calculator 8-8 is:

$$ED(r3)=DM(r3)-DM(c)=(4Y+4)-4Y=4$$

Accordingly, zero (0) is input to epsilon decision units 9-1 to 9-5 and four (4) is input to epsilon decision units 9-6 to 9-8. If the threshold value $\epsilon$ is equal to four ($\epsilon=4$), then the difference data ED(l4) to ED(r3) are all equal to or less than the threshold value $\epsilon$, so the corresponding decision data EE(l4) to EE(r3) are all '1'.

The conditional weighted averager 10 multiplies the difference data having decision data of '1' by coefficients $a_k$ and sums the results, excluding difference data with decision data of '0' from the sum. If the coefficients $a_k$ ($a_{l4}$, $a_{l3}$, $a_{l2}$, $a_{l1}$, $a_c$, $a_{r1}$, $a_{r2}$, $a_{r3}$) are all one-eighth (0.125), then the output EM of the conditional weighted averager 10 is given by equation (8).

$$EM = a_{l4} \times ED(l4) + a_{l3} \times ED(l3) + a_{l2} \times ED(l2) + \qquad (8)$$
$$a_{l1} \times ED(l1) + a_c \times ED(c) +$$
$$a_{r1} \times ED(r1) + a_{r2} \times ED(r2) + a_{r3} \times ED(r3)$$
$$= 0.125 \times 0 \times 5 + 0.125 \times 4 \times 3$$
$$= 1.5$$
$$\approx 1$$

The above processing is carried out sequentially on the image data DS supplied from the bit extender 5, each pixel becoming the pixel of interest in turn, so an operation similar to equation (8) is carried out for each successive pixel.

FIG. 19D shows the weighted average value EM output for each pixel in the image data DM in FIG. 19C. The horizontal axis in FIG. 19D represents the position i of the pixel of interest; the vertical axis represents the weighted average gray level EM. The conditional weighted averager 10 outputs the weighted average EM to the data adder 11.

The data adder 11 adds the image data DS shown in FIG. 19C to the weighted average data EM shown in FIG. 19D and outputs the image data DO shown in FIG. 19E.

As described above, when n-bit image data are converted to (n+2)-bit image data, an epsilon filter of order eight (m=8), like an epsilon filter of order four (m=4), can interpolate gray levels with values of (4Y+1), (4Y+2), and (4Y+3) to fill in a jump (of size $2^2$) from a gray level 4Y to a gray level (4Y+4) produced by bit extension in a region with gradually changing gray levels, but as shown in FIG. 19E, the slope of the interpolated data is only half as great, producing an image with gray levels that change more gradually.

Cases in which the orders of the epsilon filter were four and eight (m=4 and m=8) have been described. As the order m is increased from $2^\alpha$ to $2\times 2^\alpha$, and then to $2^2\times 2^\alpha$, an image with gray levels that change increasingly gradually is obtained. When m is a power of two (such as $2^\alpha$, $2\times 2^\alpha$, or $2^2\times 2^\alpha$), the epsilon filter can carry out division by bit shifting, which eliminates the need for a divider circuit.

The processing steps carried out by the image display apparatus in the first embodiment will be described with reference to the flowchart in FIG. 21. It will be assumed in the following description that the order of the epsilon filter is m, and the notation in FIG. 1 will be used.

First, an image signal SA is input to the input terminal 1; the receiver 2 receives the image signal SA and outputs the n-bit image data DI (step ST1).

The image data DI output from the receiver 2 are input to the bit extender 5 in the gray scale expansion processor 3. The bit extender 5 extends the image data DI by a bits and outputs (n+α)-bit image data DS to the data storage unit 7 (step ST2).

The data storage unit 7 receives the (n+α)-bit image data DS, holds the data for m horizontally consecutive pixels, and outputs the pixel data as DM(1) to DM(m) to the difference calculators 8-1 to 8-*m* (step ST3).

The difference calculators 8-1 to 8-*m* receive the successive pixel data DM(1) to DM(m), take differences between the m successive pixels and the pixel of interest DM(c), and output the difference data ED(1) to ED(m) to the epsilon decision units 9-1 to 9-*m* (step ST4).

The epsilon decision units 9-1 to 9-*m* receive the difference data ED(1) to ED(m), and output decision data EE(1) to EE(m) that indicate which difference data to select (step ST5).

The conditional weighted averager 10 receives the difference data ED(1) to ED(m) and the decision data EE(1) to EE(m), takes a weighted average of the difference data selected by the decision data, and outputs the weighted average value EM (step ST6).

The data adder 11 receives the weighted average value EM and the basic (n+α)-bit data DM(c) for the pixel of interest, adds EM and DM(c), and outputs the result as the image data DO (step ST7). The output image data DO are input to the display unit 4, which displays the image (step ST8).

Figure 22:
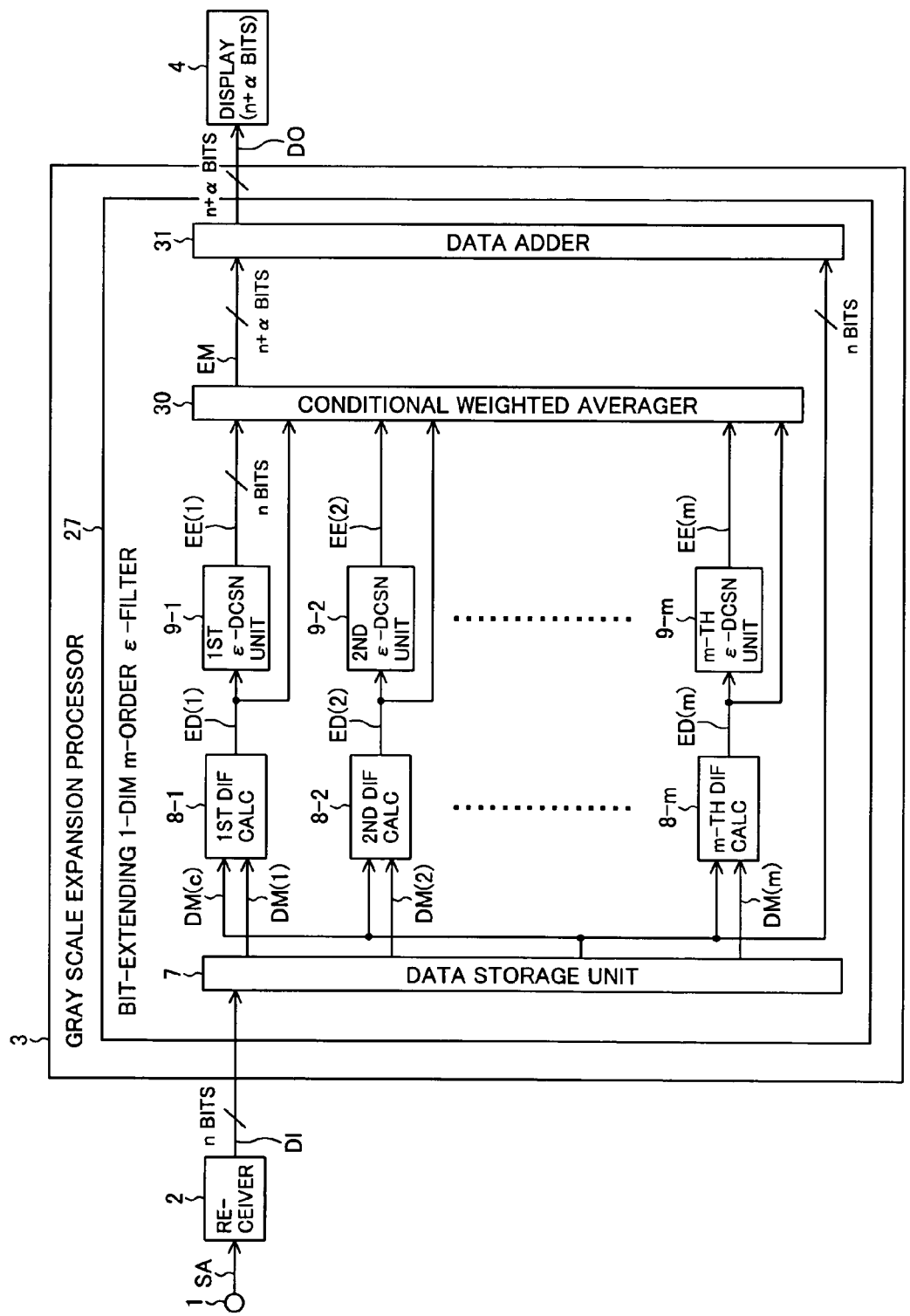
FIG. 22 is a block diagram illustrating another exemplary structure of the image display apparatus in the first embodiment.

Another exemplary structure of the image display apparatus in the first embodiment will be described with reference to FIG. 22. The image display apparatus in FIG. 22 is generally similar to the image display apparatus in FIG. 1, but does not include the bit extender 5 in FIG. 1, and has a bit-extending one-dimensional m-order epsilon filter 27 with a different conditional weighted averager 30 and data adder 31.

The difference calculators 8-1 to 8-*m* and the epsilon decision units 9-1 to 9-*m* process n-bit data. The threshold value for the epsilon decision units 9-1 to 9-*m* is set to '1', because there is no bit extender preceding the epsilon filter 27.

The conditional weighted averager 30 calculates a conditional weighted average as described in the examples above (e.g., FIGS. 4-14), but also calculates bits following the radix point and outputs a of these bits in the weighted average data EM, which accordingly have (n+α) bits.

The data adder 31 extends the n-bit input data DM(c) to (n+α) bits and adds the result to the EM data.

Although the image display apparatus in FIG. 22 carries out a bit extension as part of the operation of the epsilon filter 27 instead of at a stage preceding the epsilon filter, this structure can produce the same effect as the structure in FIG. 1.

Second Embodiment

Figure 23:
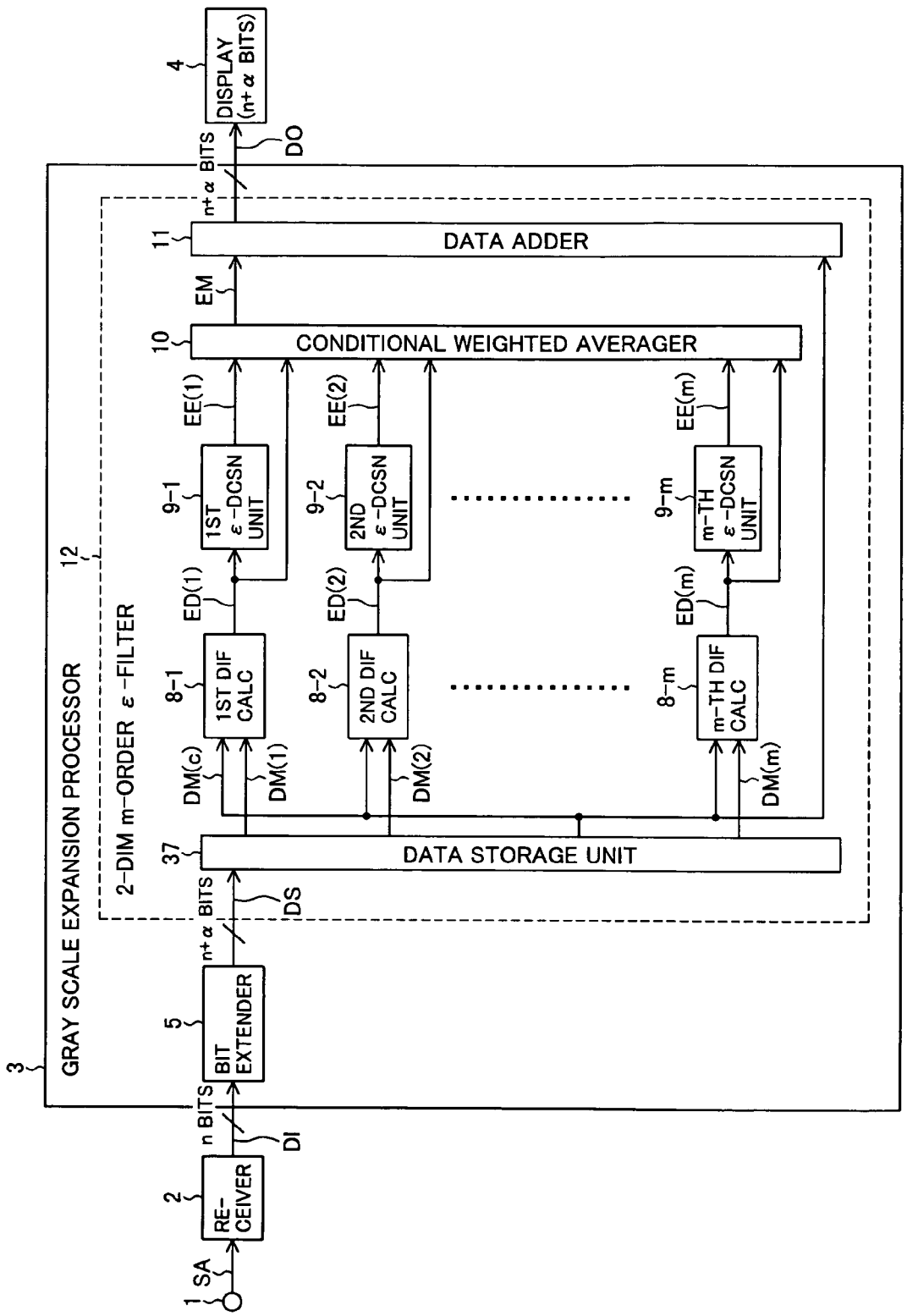
FIG. 23 is a block diagram illustrating the structure of the image display apparatus in the second embodiment.

Referring to FIG. 23, the image display apparatus in the second embodiment of the invention comprises an input terminal 1, a receiver 2, a gray scale expansion processor 3, and a display unit 4. The receiver 2 and the gray scale expansion processor 3 constitute the image processing apparatus.

An analog image signal SA is input from the input terminal 1 to the receiver 2, converted to n-bit image data DI, and output to the gray scale expansion processor 3. The gray scale expansion processor 3 includes a bit extender 5 and a two-dimensional m-order epsilon filter 12, which convert the n-bit image data to (n+α)-bit data and output the data to the display unit 4. The bit extender 5 outputs (n+α)-bit image data obtained by extending the n-bit image data DI by a bits to the two-dimensional m-order epsilon filter 12.

The two-dimensional m-order epsilon filter 12 carries out processing on a two-dimensional region measuring h pixels horizontally by v pixels vertically (where h and v are integers equal to or greater than $2^\alpha$. The two-dimensional m-order epsilon filter 12 is an edge-preserving smoothing filter that processes pixels aligned two-dimensionally so as to preserve large abrupt changes (edges) while smoothing out small abrupt changes as if they were noise. The two-dimensional m-order epsilon filter 12 in FIG. 23 includes a data storage unit 37, a plurality of difference calculators 8-1 to 8-*m*, a plurality of epsilon decision units 9-1 to 9-*m*, a conditional weighted averager 10, and a data adder 11. The two-dimensional m-order epsilon filter 12 eliminates gray scale jumps in the expanded gray scale produced by the bit extender 5, thereby increasing the number of effective gray scale levels in the output image data DO.

The image data DO are output to the display unit 4, which is capable of displaying (n+α)-bit image data.

The two-dimensional processing carried out by the epsilon filter 12 is described by equation (9).

In this equation, x(i, j) is the gray level of the input; y(i, j) is the gray level of the output; $a_k$ is a coefficient; k indicates relative horizontal pixel position from the pixel of interest (i, j); k' indicates relative vertical pixel position from the pixel of interest (i, j); ε is a threshold value.

$$y(i,j) = x(i,j) + \sum_{k=-h/2+1}^{h/2} \sum_{k'=-v/2+1}^{v/2} a_{hv} f\{x(i-k, j-k') - x(i,j)\} \quad (9)$$

$$f(u) = \begin{cases} u & (u \le \varepsilon) \\ 0 & (u > \varepsilon) \end{cases}$$

Figure 24:
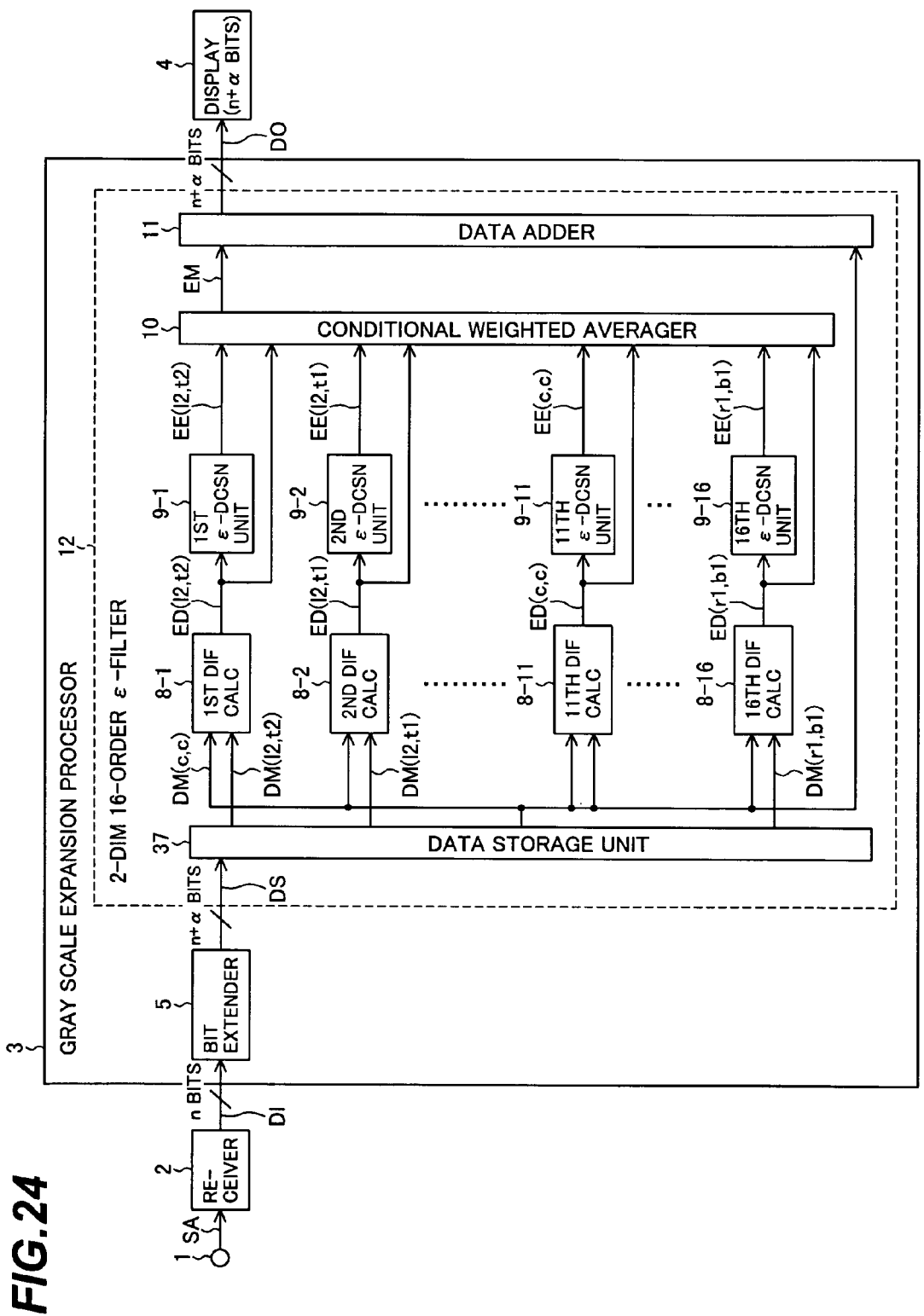
FIG. 24 is a block diagram illustrating the structure of the image display apparatus in the second embodiment when n-bit image data are extended to (n+2)-bit image data.

A case in which α equals two (α=2) and n-bit image data are expanded to the (n+2)-bit data will now be described. FIG. 24 illustrates the structure of the image display apparatus in this case when the order m is sixteen (m=4×4=16).

First, the operation when a signal with gray levels that change gradually in the horizontal direction is input to the epsilon filter 12 will be described.

The receiver 2 converts the analog image signal SA to n-bit image data DI and outputs the image data DI to the bit extender 5 in the gray scale expansion processor 3.

The operation of the bit extender 5 will be described with reference to FIGS. 25A and 25B. Each square represents a pixel position, in which the gray level of the corresponding pixel is indicated. FIG. 25A represents the gray levels of the n-bit image data DI; FIG. 25B represents the gray levels of the (n+2)-bit image data DS.

The bit extender 5 extends the n-bit image data as shown in FIG. 25A by two bits and outputs the resulting (n+2)-bit image data DS as shown in FIG. 25B to the two-dimensional m-order epsilon filter 12.

The two-bit extension of the image data DI in FIG. 25A converts gray level Y to 4Y and converts gray level (Y+1) to 4(Y+1) in the (n+2)-bit image data DS as shown in FIG. 25B.

Figures 26A, 26B:
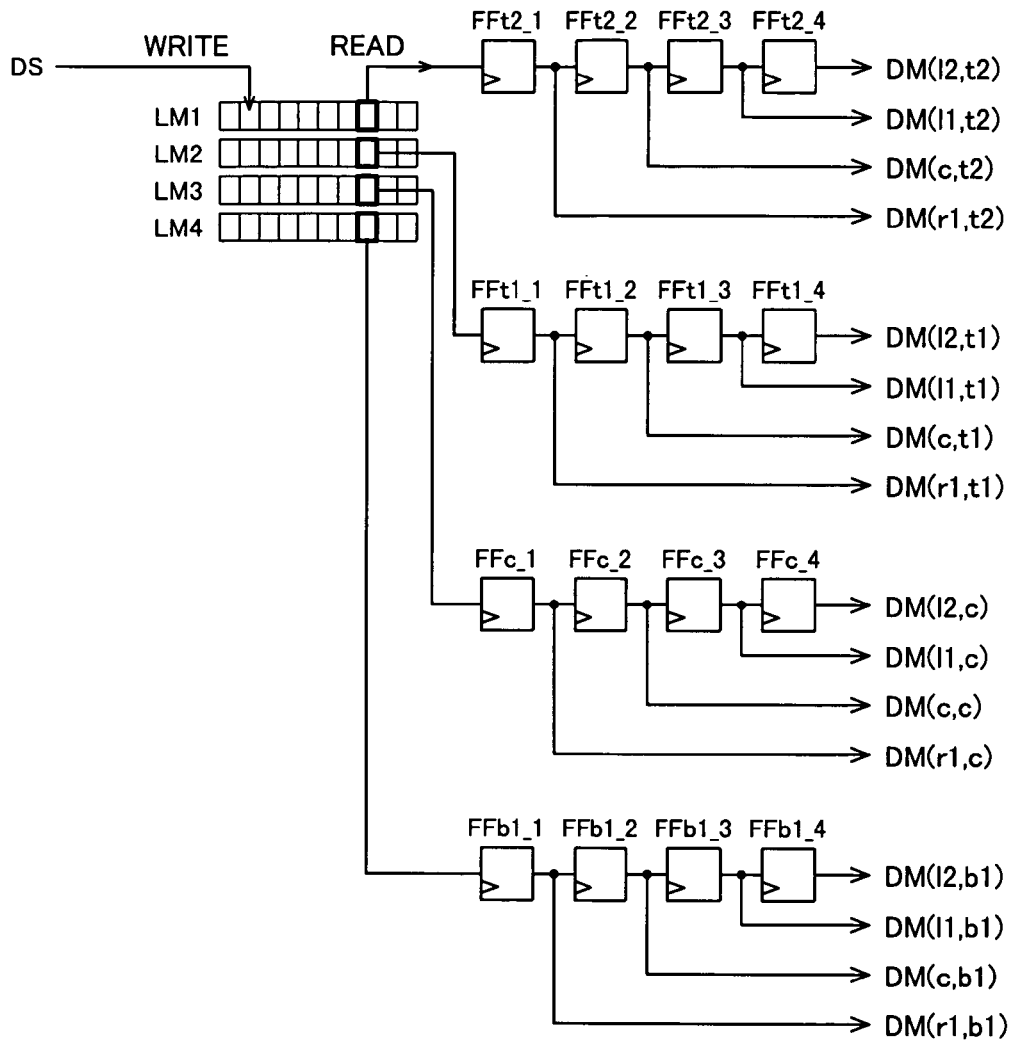
FIGS. 26A and 26B illustrate the structure of the data storage unit in the second embodiment.

The data storage unit 37 in FIG. 24 is structured as shown in FIG. 26A, for example.

The data storage unit 37 includes four line memories LM1 to LM4 and four sets of four cascaded flip-flops FFt2_1 to FFt2_4, FFt1_1 to FFt1_4, FFc_1 to FFc_4, and FFb1_1 to FFb1_4. The image signal DS is input through the line memories LM1 to LM4 to the four sets of flip-flops.

Each of the line memories LM1 to LM4 can store one horizontal line of image data; the four line memories LM1 to LM4 hold four consecutive lines of data.

Starting from the left ends of the lines and proceeding in sequence to the right, data for pixels aligned vertically in the same column are simultaneously read from the line memories LM1 to LM4 and supplied to the first flip-flops FFt2_1, FFt1_1, FFc_1, and FFr1_1 in the four sets of flip-flops. The supplied data are then transferred sequentially through the four flip-flops in each set.

As a result, data in a (4×4)-pixel region as illustrated in FIG. 26B are held in the flip-flops FFt2_1 to FFt2_4, FFt1_1 to FFt1_4, FFc_1 to FFc_4, and FFb1_1 to FFb1_4, and are output simultaneously as data DM(l2, t2) (for the top left pixel in the region) to DM(r1, b1) (for the bottom right pixel in the region).

The data storage unit 37 outputs data in the region TL surrounded by the bold line in FIG. 27, for example, as DM(l2, t2) to DM(r1, b1). The pixel in the third row from the top and the third column from the left in the region TL is the pixel of interest, and its coordinates represented as (c, c). In the example shown, 4Y is output in the left half of region TL, as DM(l2, t2) to DM(l1, b1), and (4Y+4) is output in the right half, as DM(c, t2) to DM(r1, b1). The output data are supplied to the difference calculators 8-1 to 8-16.

The first difference calculator 8-1 takes the difference ED(l2, t2) between the value of the pixel of interest DM(c, c) and the value of the data of the left-top neighboring pixel DM(l2, t2), and outputs the difference data to the first epsilon decision unit 9-1 and the conditional weighted averager 10. Difference calculators 8-2 to 8-16 similarly generate difference data ED(l2, t1) to ED(r1, b1) based on neighboring pixel data DM(l2, t1) to DM(r1, b1), and output the difference data to epsilon decision units 9-2 to 9-16 and the conditional weighted averager 10.

The output of the first difference calculator 8-1 is:

$$ED(l2,t2)=4Y-(4Y+4)=-4$$

The output of the second difference calculator 8-2 is:

$$ED(l2,t1)=4Y-(4Y+4)=-4$$

The output of the third difference calculator 8-3 is:

$$ED(l2,c)=4Y-(4Y+4)=-4$$

The output of the fourth difference calculator 8-4 is:

$$ED(l2,b1)=4Y-(4Y+4)=-4$$

The output of the fifth difference calculator 8-5 is:

$$ED(l1,t2)=4Y-(4Y+4)=-4$$

The output of the sixth difference calculator 8-6 is:

$$ED(l1,t1)=4Y-(4Y+4)=-4$$

The output of the seventh difference calculator 8-7 is:

$$ED(l1,c)=4Y-(4Y+4)=-4$$

The output of the eighth difference calculator 8-8 is:

$$ED(l1,b1)=4Y-(4Y+4)=-4$$

The output of the ninth difference calculator 8-9 is:

$$ED(c,t2)=(4Y+4)-(4Y+4)=0$$

The output of the tenth difference calculator 8-10 is:

$$ED(c,t1)=(4Y+4)-(4Y+4)=0$$

The output of the eleventh difference calculator 8-11 is:

$$ED(c,c)=(4Y+4)-(4Y+4)=0$$

The output of the twelfth difference calculator 8-12 is:

$$ED(c,b1)=(4Y+4)-(4Y+4)=0$$

The output of the thirteenth difference calculator 8-13 is:

$$ED(r1,t2)=(4Y+4)-(4Y+4)=0$$

The output of the fourteenth difference calculator 8-14 is:

$$ED(r1,t1)=(4Y+4)-(4Y+4)=0$$

The output of the fifteenth difference calculator 8-15 is:

$$ED(r1,c)=(4Y+4)-(4Y+4)=0$$

The output of the sixteenth difference calculator 8-16 is:

$$ED(r1,b1)=(4Y+4)-(4Y+4)=0$$

The detailed operation of the epsilon decision units is the same as in the first embodiment. The first epsilon decision unit 9-1 generates '1' when the difference ED(l2, t2) is greater than $\epsilon$, and generates '0' when the difference ED(l2, t2) is equal to or less than E. Epsilon decision units 9-2 to 9-16 similarly generate decision data EE(l1, t2) to EE(r1, b1) conditional on the difference data ED(l1, t2) to ED(r1, b1), and output the decision data to the conditional weighted averager 10.

In the example shown in FIG. 27, epsilon decision units 9-1 to 9-8 receive difference data equal to minus four (−4) and epsilon decision units 9-9 to 9-16 receive difference data equal to zero (0). Accordingly, if $\epsilon$ is equal to four ($\epsilon$=4), the difference data ED(l1, t2) to ED(r1, b1) are all equal to or less than $\epsilon$; thus the decision data EE(l2, t2) to EE(r1, b1) are all '1'.

The conditional weighted averager 10 calculates the weighted average of the difference data ED(l2, t2) to ED(r1, b1) conditional on the decision data EE(l2, t2) to EE(r1, b1). When the decision data are '1', the difference data are multiplied by respective coefficients $a_k$ and the products are summed; when the decision data are '0', the products are not included in the sum.

If the coefficients $a_k$ ($a_{l2t2}$, $a_{l1t2}$, ..., $a_{r1b1}$) are all one-sixteenth (0.0625), then since the decision data EE(l2, t2) to EE(r1, b1) are all '1' in the example above, the output EM of the conditional weighted averager 10 is given by equation (10).

$$\begin{aligned}EM &= a_{l2t2} \times ED(l2, t2) + a_{l1t2} \times ED(l1, t2) + \ldots + \\ &\quad a_{r1b1} \times ED(r1, b1) \\ &= 0.0625 \times (-4) \times 8 + 0.0625 \times 0 \times 8 \\ &= -2\end{aligned} \quad (10)$$

The above processing is carried out sequentially on the image data DS supplied from the bit extender 5, each pixel becoming the pixel of interest in turn, so an operation similar to equation (10) is carried out for each consecutive pixel.

FIG. 28 shows the weighted average value EM output for each pixel in the image data DM in FIG. 27. The conditional weighted averager 10 outputs the weighted average EM to the data adder 11.

The data adder 11 adds the image data DS shown in FIG. 25B to the weighted averages EM shown in FIG. 28, and outputs the resulting image data DO shown in FIG. 29. FIG. 29 shows the gray levels of the data DO output from the data adder 11. The values indicated in the pixel positions represent the gray levels of the data DO.

The operation when the epsilon filter 12 receives a signal with gray levels that change gradually in the vertical direction will now be described.

The receiver 2 converts the analog input signal SA to n-bit digital image data DI and outputs the result to the gray scale expansion processor 3, more specifically to the bit extender 5 in the gray scale expansion processor 3.

The operation of the bit extender 5 will be described with reference to FIGS. 30A and 30B. Each square represents a pixel position, in which the gray level of the corresponding pixel is indicated. FIG. 30A represents the gray levels of the n-bit image data DI; FIG. 30B represents the gray levels of the (n+2)-bit image data DS.

The bit extender 5 extends the n-bit image data shown in FIG. 30A by two bits and outputs the resulting (n+2)-bit image data DS shown in FIG. 30B to the two-dimensional m-order epsilon filter 12.

The two-bit extension of the image data DI in FIG. 30A converts gray level Y to 4Y and converts gray level (Y+1) to 4(Y+1) or 4Y+4 in the (n+2)-bit image data DS shown in FIG. 30B.

FIG. 31 shows the output of the data storage unit 37 when the pixel at pixel position (c, c) is the pixel of interest. The data storage unit 37 outputs the data below, which are shown in the region within the bold line TL, to the difference calculators 8-1 to 8-16.

$DM(l2,t2)=4Y,$ $DM(l2,t1)=4Y,$ $DM(l2,c)=4Y+4,$ $DM(l2,b1)=4Y+4,$ $DM(l1,t2)=4Y,$ $DM(l1,t1)=4Y,$ $DM(l1,c)=4Y+4,$ $DM(l1,b1)=4Y+4,$ $DM(c,t2)=4Y,$ $DM(c,t1)=4Y,$ $DM(c,c)=4Y+4,$ $DM(c,b1)=4Y+4,$ $DM(r1,t2)=4Y,$ $DM(r1,t1)=4Y,$ $DM(r1,c)=4Y+4,$ $DM(r1,b1)=4Y+4.$

The output of the first difference calculator 8-1 is:

$ED(l2,t2)=4Y-(4Y+4)=-4.$

The output of the second difference calculator 8-2 is:

$ED(l2,t1)=4Y-(4Y+4)=-4.$

The output of the third difference calculator 8-3 is:

$ED(l2,c)=(4Y+4)-(4Y+4)=0$

The output of the fourth difference calculator 8-4 is:

$ED(l2,b1)=(4Y+4)-(4Y+4)=0$

The output of the fifth difference calculator 8-5 is:

$ED(l1,t2)=4Y-(4Y+4)=-4.$

The output of the sixth difference calculator 8-6 is:

$ED(l1,t1)=4Y-(4Y+4)=-4.$

The output of the seventh difference calculator 8-7 is:

$ED(l1,c)=(4Y+4)-(4Y+4)=0$

The output of the eighth difference calculator 8-8 is:

$ED(l1,b1)=(4Y+4)-(4Y+4)=0$

The output of the ninth difference calculator 8-9 is:

$ED(c,t2)=4Y-(4Y+4)=-4.$

The output of the tenth difference calculator 8-10 is:

$ED(c,t1)=4Y-(4Y+4)=-4.$

The output of the eleventh difference calculator 8-11 is:

$ED(c,c)=(4Y+4)-(4Y+4)=0$

The output of the twelfth difference calculator 8-12 is:

$ED(c,b1)=(4Y+4)-(4Y+4)=0$

The output of the thirteenth difference calculator 8-13 is:

$ED(r1,t2)=4Y-(4Y+4)=-4.$

The output of the fourteenth difference calculator 8-14 is:

$ED(r1,t1)=4Y-(4Y+4)=-4.$

The output of the fifteenth difference calculator 8-15 is:

$ED(r1,c)=(4Y+4)-(4Y+4)=0$

The output of the sixteenth difference calculator 8-16 is:

$ED(r1,b1)=(4Y+4)-(4Y+4)=0$

The first epsilon decision unit 9-1 generates '1' when the difference ED(l2, t2) is greater than ϵ, and generates '0' when the difference ED(l2, t2) is equal to or less than ϵ. Epsilon decision units 9-2 to 9-16 generate similar decision data EE(l1, t2) to EE(r1, b1) conditional on the difference data ED(l1, t2) to ED(r1, b1). The decision data are output to the conditional weighted averager 10.

In the example shown in FIG. 32, the difference data ED(l2, t2) to ED(r1, b1) are all −4 or 0, so if the threshold ϵ is four (ϵ=4), the difference data are all equal to or less than ϵ and the decision data EE(l2, t2) to EE(r1, b1) are all '1'.

The conditional weighted averager 10 calculates the weighted average of the difference data ED(l2, t2) to ED(r1, b1) conditional on the decision data EE(l2, t2) to EE(r1, b1). When the decision data are '1', the difference data are multiplied by respective coefficients $a_k$ and the products are summed; when the decision data are '0', the products are not included in the sum.

If the coefficients $a_k$ ($a_{l2t2}$, $a_{l1t2}$, . . . $a_{r1b1}$) are all one-sixteenth (0.0625), then since the decision data EE(l2, t2) to EE(r1, b1) are all '1' in the example above, the output EM of the conditional weighted averager 10 is given by equation (11).

$$EM = a_{12t2} \times ED(12, t2) + a_{11t2} \times ED(11, t2) + \ldots + \\ a_{r1b1} \times ED(r1, b1) \\ = 0.0625 \times (-4) \times 8 + 0.0625 \times 0 \times 8 \\ = -2 \quad (11)$$

The above processing is carried out sequentially on the image data DS supplied from the bit extender 5, each pixel becoming the pixel of interest in turn, so an operation similar to equation (11) is carried out for each consecutive pixel.

FIG. 28 shows the weighted average value EM output for each pixel in the image data DM in FIG. 31. The conditional weighted averager 10 outputs the weighted average EM to the data adder 11.

Figures 33, 34:
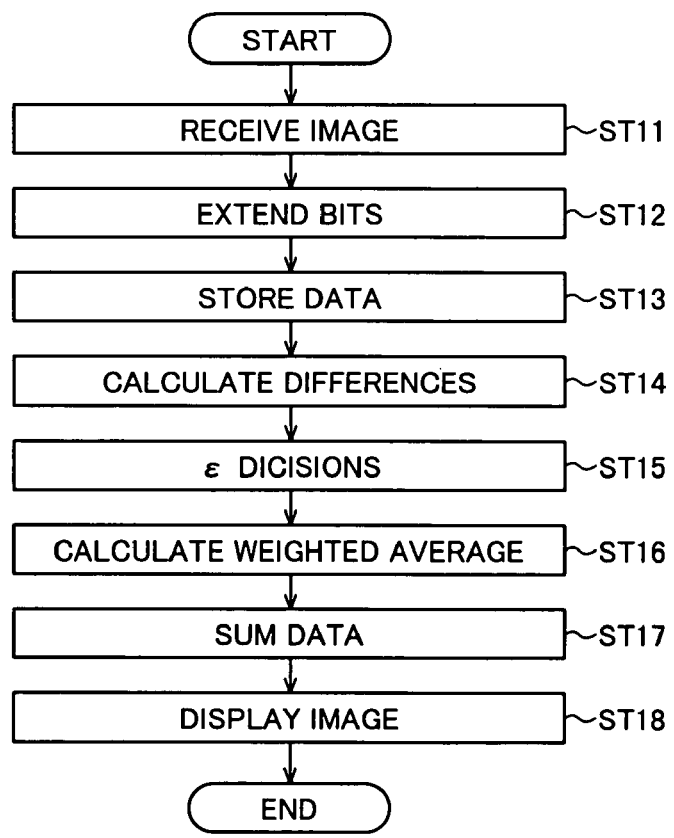
FIG. 33 illustrates the operation of the data adder in the second embodiment.
FIG. 34 is a flowchart illustrating the processing steps carried out by the image display apparatus in the second embodiment.

The data adder 11 adds the image data DS shown in FIG. 30B to the weighted average values EM shown in FIG. 32, and outputs the resulting image data DO shown in FIG. 33. FIG. 33 shows the gray levels of the data DO output from the data adder 11. The values indicated in the pixel positions represent the gray levels of the output data DO.

As described above, this embodiment can increase the number of gray levels in a region in which the gray levels change gradually in at least the horizontal or vertical direction. That is, when the order m of the epsilon filter 12 is sixteen ($2^2 \times 2^2$), jumps by four (a power of two) gray levels from 4Y to (4Y+4) in a region with gradually changing gray levels as shown in FIGS. 29 and 33 can be smoothed out by interpolating levels of (4Y+1), (4Y+2), and (4Y+3).

As in the first embodiment, if the order m of the epsilon filter 12 is greater than ($2^\alpha \times 2^\alpha$), an image with gray levels that change more gradually can be obtained. If m is a power of two such as $2^\alpha \times 2^\alpha$, $(2 \times 2^\alpha) \times 2^\alpha$, $2^+ \times (2 \times 2^\alpha)$, or $(2 \times 2^\alpha) \times (2 \times 2^\alpha)$, the epsilon filter 12 can carry out division by bit shifting, which eliminates the need for a divider circuit.

The processing steps carried out by the image display apparatus in the second embodiment will be described with reference to the flowchart in FIG. 34. It will be assumed in the following description that the order of the epsilon filter 12 is m, and the notation in FIG. 23 will be used.

First, an image signal SA is input to the input terminal 1; the receiver 2 receives the image signal SA and outputs n-bit image data DI (step ST11).

The image data DI output from the receiver 2 are input to the bit extender 5 in the gray scale expansion processor 3. The bit extender 5 extends the image data DI by a bits and outputs (n+α)-bit image data DS to the data storage unit 37 (step ST12).

The data storage unit 37 receives the (n+α)-bit image data DS, holds pixels in an (h×v)-pixel (an m-pixel) region (where h≧$2^\alpha$, v≧$2^\alpha$, h×v=m, m≧$2^\alpha \times 2^\alpha$), and outputs the pixel data as DM(1) to DM(m) to the difference calculators 8-1 to 8-$m$ (step ST13).

The difference calculators 8-1 to 8-$m$ receive the consecutive pixel data DM(1) to DM(m) in the (h×v)-pixel region, take differences between the m pixels and the pixel of interest DM(c), and output the difference data ED(1) to ED(m) to the epsilon decision units 9-1 to 9-$m$ (step ST14).

The epsilon decision units 9-1 to 9-$m$ receive the difference data ED(1) to ED(m) and output decision data EE(1) to EE(m) that indicate which difference data to select (step ST15).

The conditional weighted averager 10 receives the difference data ED(1) to ED(m) and the decision data EE(1) to EE(m), takes a weighted average of the difference data selected by the decision data, and outputs the weighted average value EM (step ST16).

The data adder 11 receives the weighted average value EM and the basic (n+α)-bit data DM(c) for the pixel of interest, adds EM and DM(c), and outputs the result as the image data DO (step ST17). The image data DO are input to the display unit 4, which displays the image (step ST18).

Figure 35:
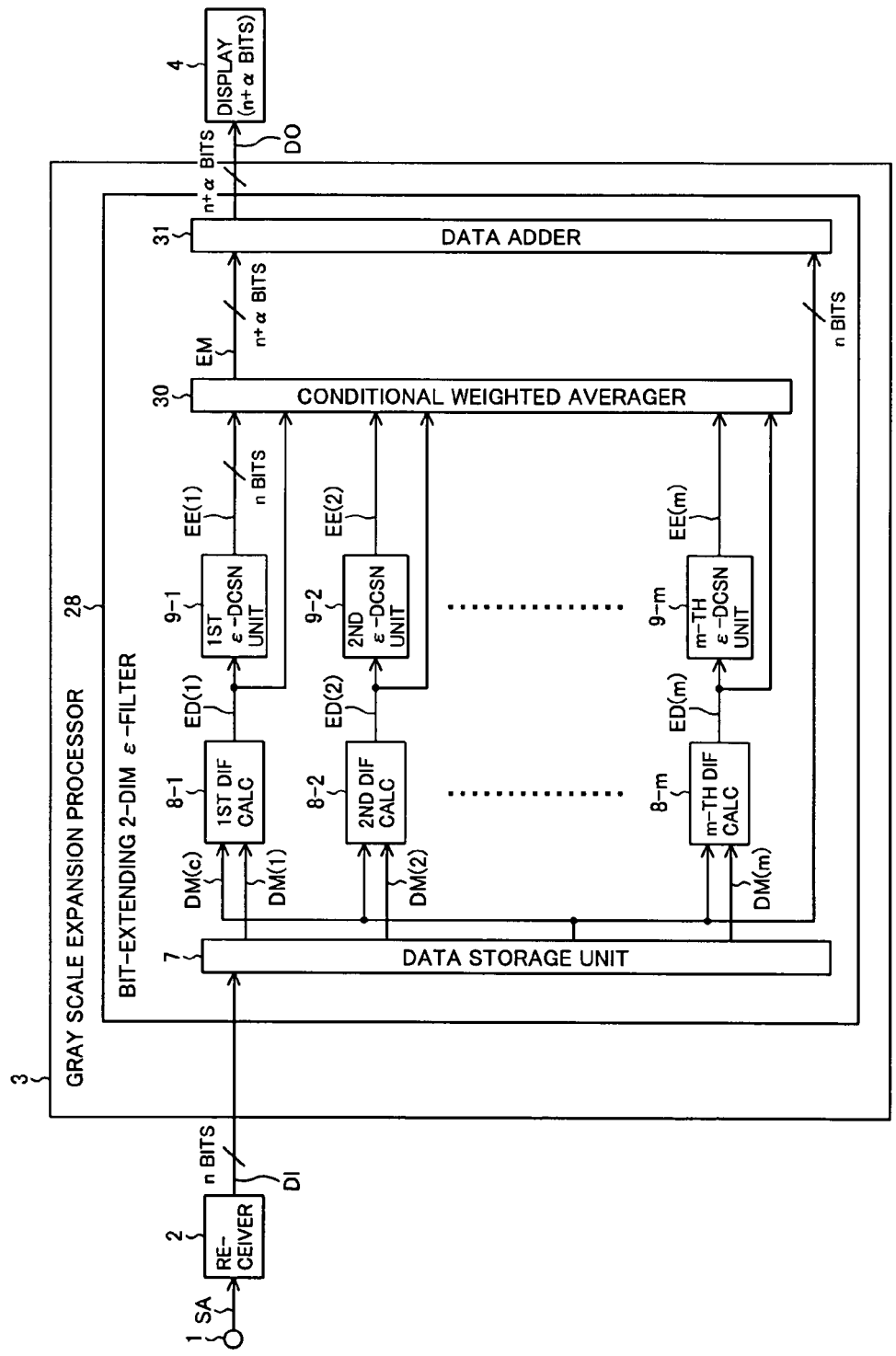
FIG. 35 is a block diagram illustrating another exemplary structure of the image display apparatus in the second embodiment.

Another exemplary structure of the image display apparatus in the second embodiment will be described with reference to FIG. 35. The image display apparatus in FIG. 35 is generally similar to the image display apparatus in FIG. 23, but does not include the bit extender 5 in FIG. 23, and has a bit-extending two-dimensional m-order epsilon filter 28 with a different conditional weighted averager 30 and data adder 31.

The difference calculators 8-1 to 8-$m$ and the epsilon decision units 9-1 to 9-$m$ process n-bit data. The threshold value for the epsilon decision units 9-1 to 9-$m$ is set to '1', because there is no bit extender preceding the epsilon filter 28.

The conditional weighted averager 30 calculates a conditional weighted average as described in the examples above (FIGS. 24-34), but also calculates bits following the radix point and outputs a of these bits in the weighted average data EM, which accordingly have (n+α) bits.

The data adder 31 extends the n-bit input data DM(c) to (n+α) bits and adds the result to the EM data.

Although the image display apparatus in FIG. 35 carries out a bit extension as part of the operation of the epsilon filter 28 instead of at a stage preceding the epsilon filter, this structure can produce the same effect as the structure in FIG. 23.

Third Embodiment

Figure 36:
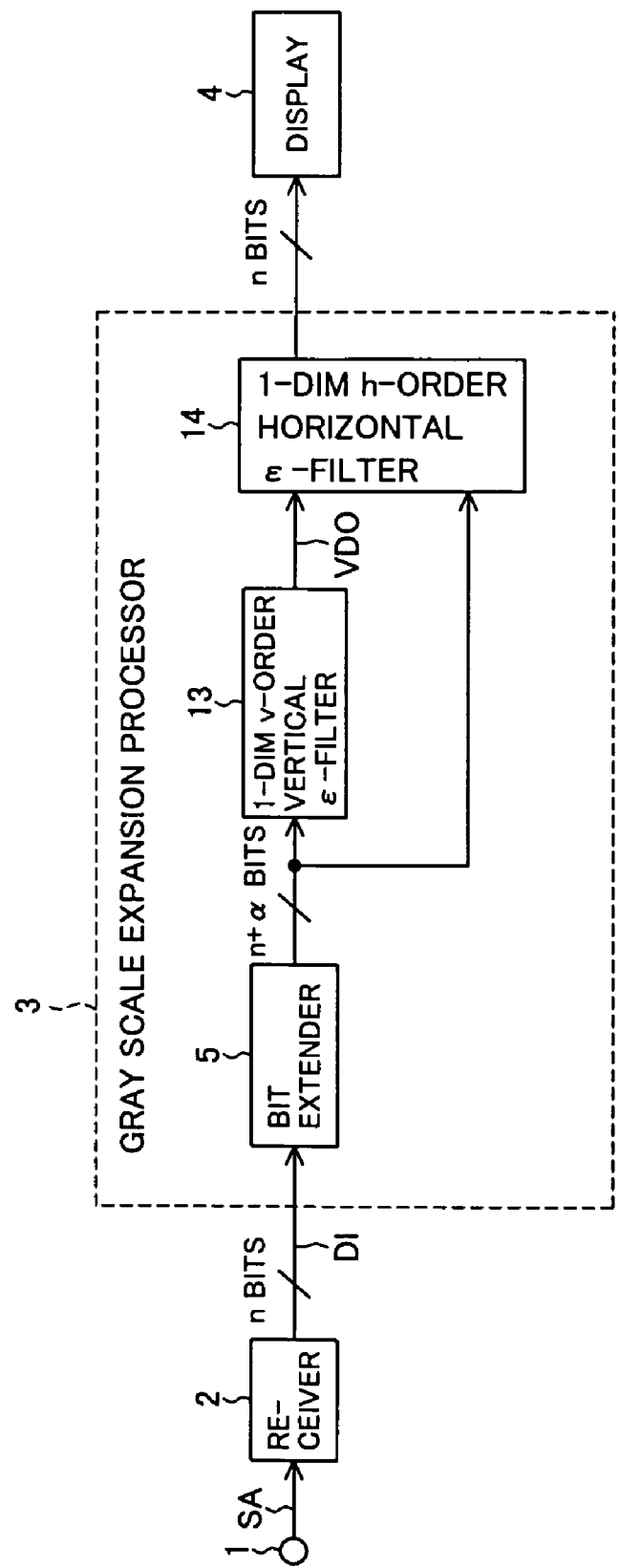
FIG. 36 is a block diagram illustrating the structure of the image display apparatus in the third embodiment.

Referring to FIG. 36, the image display apparatus in the third embodiment of the invention comprises an input terminal 1, a receiver 2, a gray scale expansion processor 3, and a display unit 4. The receiver 2 and the gray scale expansion processor 3 constitute the image processing apparatus.

An analog image signal SA is input from the input terminal 1 to the receiver 2, converted to n-bit image data DI, and output to the gray scale expansion processor 3. The gray scale expansion processor 3 includes a bit extender 5, a one-dimensional v-order vertical epsilon filter 13, and a one-dimensional h-order horizontal epsilon filter 14, which convert the n-bit image data to (n+α)-bit data and output the data to the display unit 4.

The bit extender 5 outputs (n+α)-bit image data DS obtained by extending the n-bit image data DI by a bits to the one-dimensional v-order vertical epsilon filter 13 and one-dimensional h-order horizontal epsilon filter 14.

The one-dimensional v-order vertical epsilon filter 13 carries out processing on the basic (n+α)-bit data in the vertical direction, operating as an edge-preserving smoothing filter that processes pixels aligned vertically with the pixel of interest so as to preserve large abrupt changes (edges) while smoothing out small abrupt changes as if they were noise. The one-dimensional v-order vertical epsilon filter 13 shown in FIG. 36 has the structure shown in FIG. 37, for example, including a vertical data storage unit 15, a plurality of vertical difference calculators 16-1 to 16-$v$, a plurality of vertical epsilon decision units 17-1 to 17-$v$, a vertical conditional weighted averager 18, and a vertical data adder 19. The one-dimensional v-order vertical epsilon filter 13 increases the number of effective gray levels in the vertical direction of the image data DS and outputs data with the increased number of gray levels as image data VDO to the one-dimensional h-order horizontal epsilon filter 14.

The one-dimensional h-order horizontal epsilon filter 14 carries out processing on the (n+α)-bit data VDO received from the one-dimensional v-order vertical epsilon filter 13 in the horizontal direction, operating as an edge-preserving smoothing filter that processes pixels aligned in the horizontal direction with the pixel of interest so as to preserve large abrupt changes (edges) while smoothing out small abrupt changes as if they were noise. The one-dimensional h-order horizontal epsilon filter 14 shown in FIG. 36 has the structure shown in FIG. 38, for example, including a basic data storage unit 20, a plurality of basic data difference calculators 21-1 to 21-$h$, a plurality of horizontal epsilon decision units 22-1 to 22-$h$, a horizontal data storage unit 23, a plurality of horizontal difference calculators 24-1 to 24-$h$, a horizontal conditional weighted averager 25, and a horizontal data adder 26. The one-dimensional h-order horizontal epsilon filter 14 increases the number of effective gray levels of the image data VDO conditional on horizontal gray level changes of the image data DS and outputs (n+α)-bit data with the increased number of gray levels as the image data DO to the display unit 4. The display unit 4 displays the (n+α)-bit output image data DO.

Figure 39:
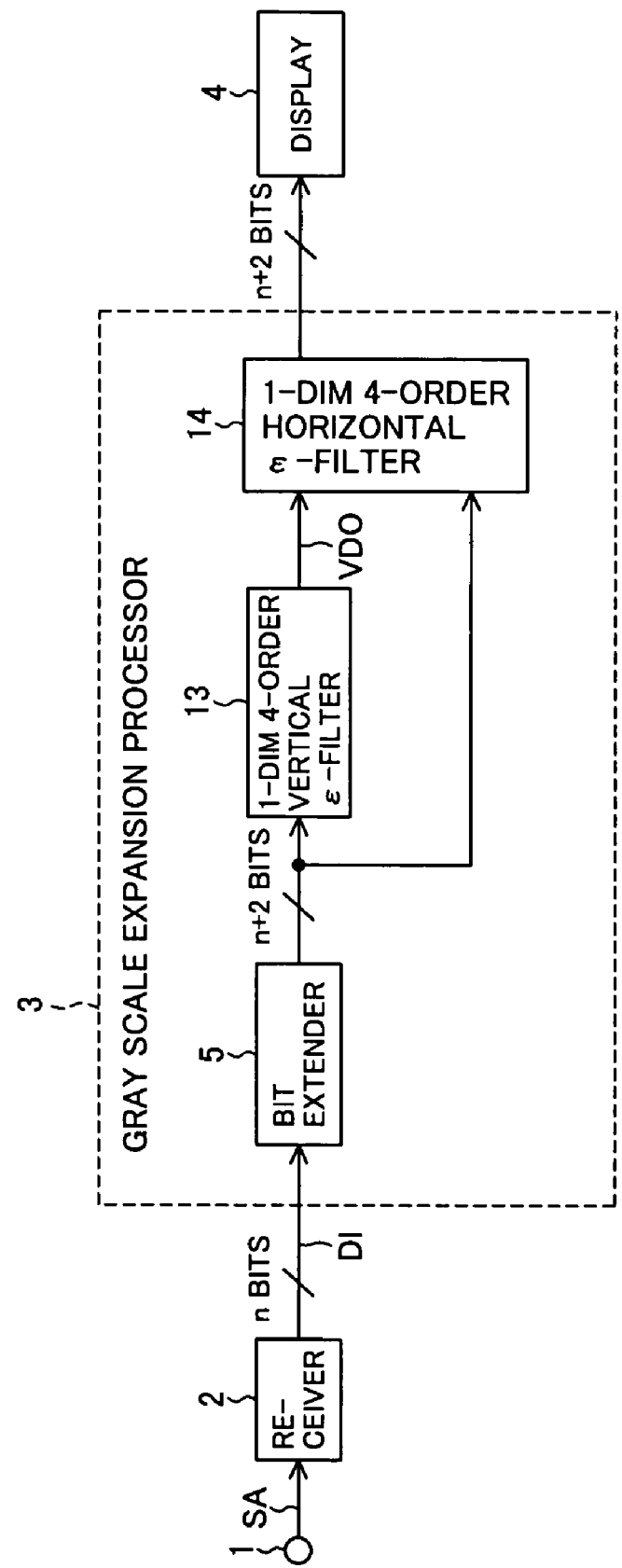
FIG. 39 is a block diagram illustrating the structure of the image display apparatus in the third embodiment when n-bit image data are expanded to (n+2)-bit image data.
Figure 40:
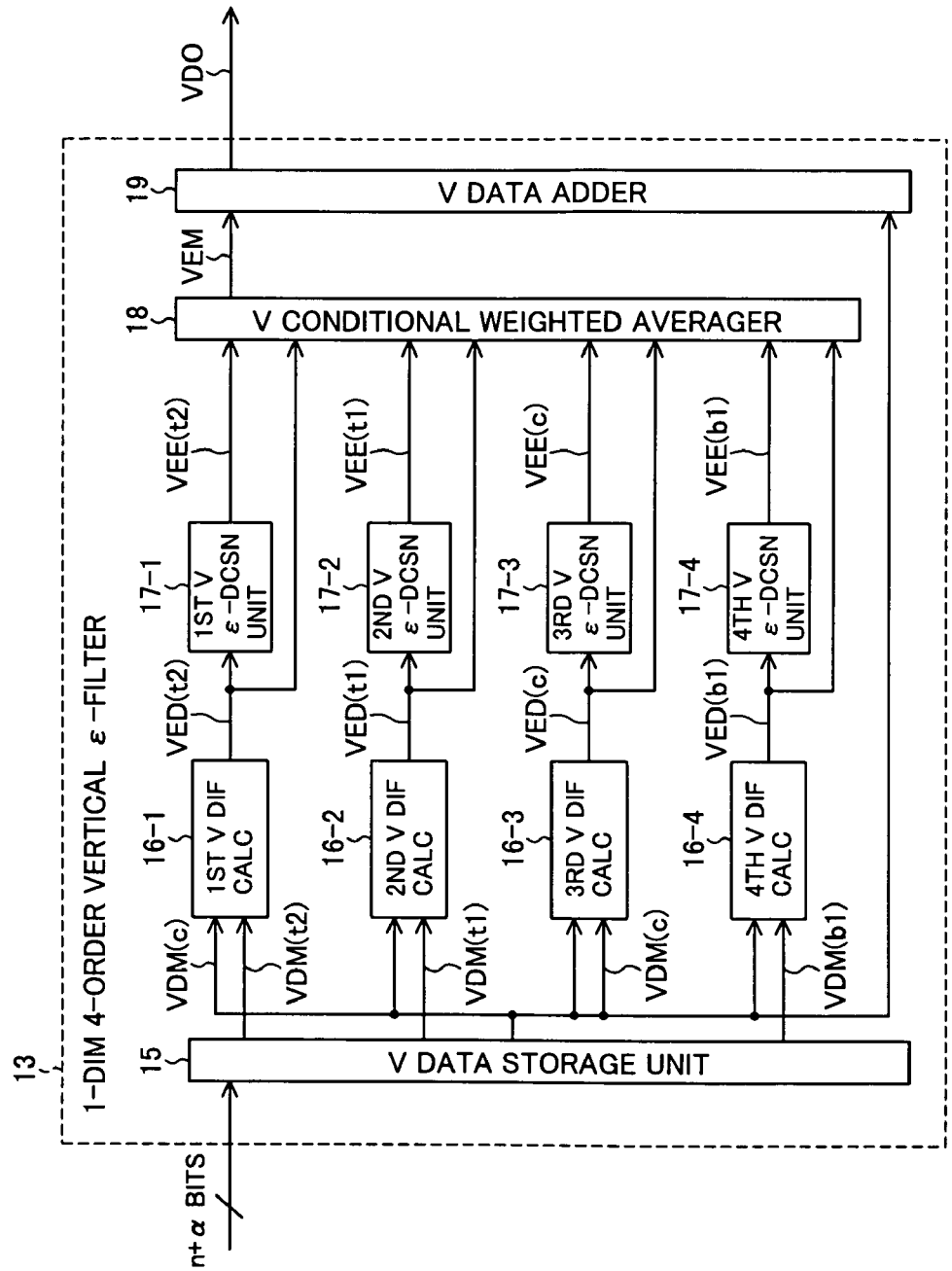
FIG. 40 is a block diagram illustrating an exemplary structure of the one-dimensional v-order vertical epsilon filter in FIG. 39.
Figure 41:
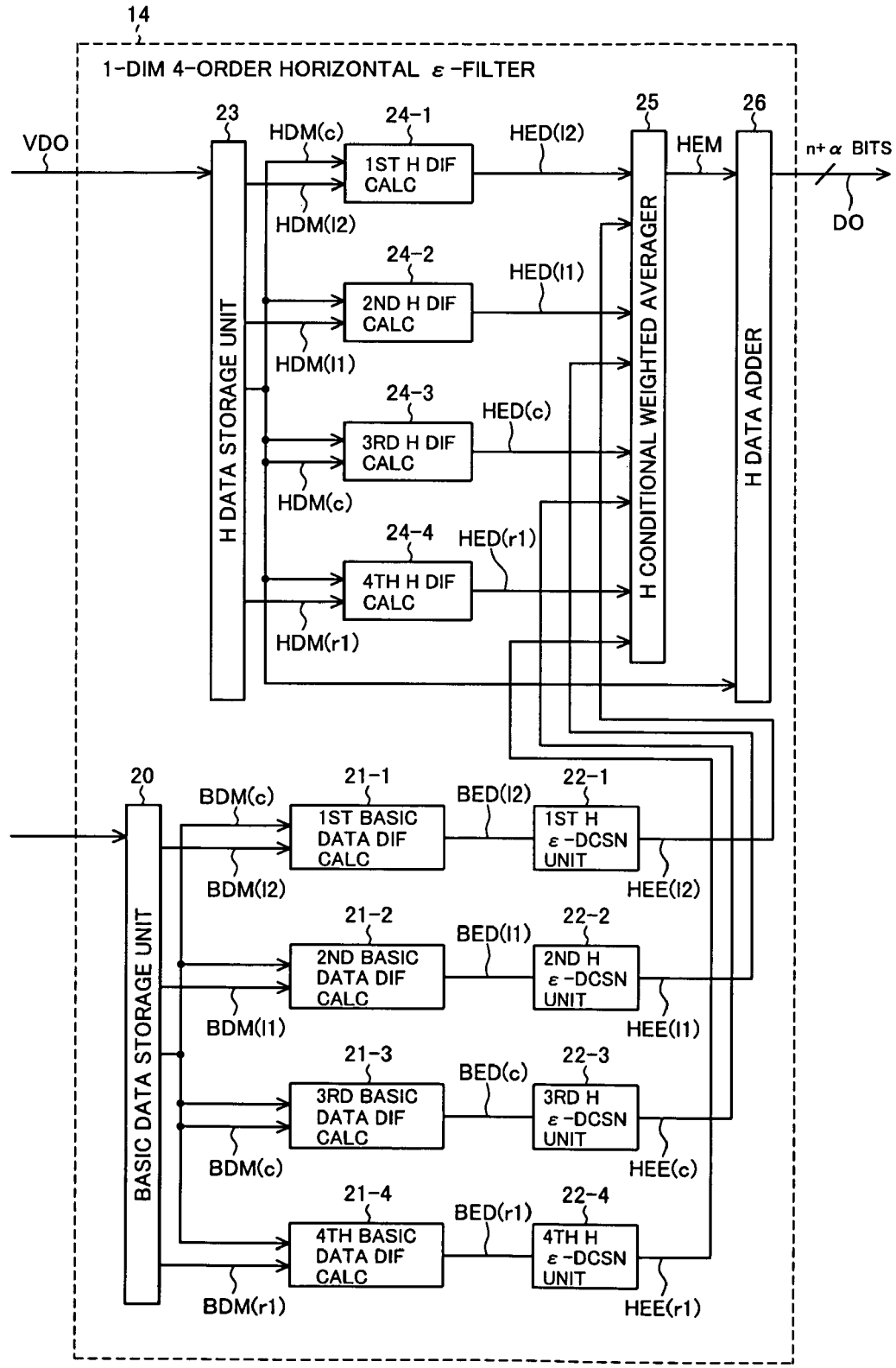
FIG. 41 is a block diagram illustrating an exemplary structure of the one-dimensional h-order horizontal epsilon filter in FIG. 39.

The case in which α equals two (α=2), so that n-bit image data are expanded to (n+2)-bit data, will now be described. FIGS. 39, 40, and 41 illustrate the structure of the image display apparatus according to the third embodiment when h and v both equal four (h=4, v=4); these drawings correspond to FIGS. 36, 37, and 38.

First, the operation when a signal with gray levels that change gradually in the horizontal direction is input to the epsilon filter will be described.

The receiver 2 converts the analog image signal SA to n-bit image data DI and outputs the image data DI to the bit extender 5 in the gray scale expansion processor 3.

The operation of the bit extender 5 will be described with reference to FIGS. 42A and 42B. Each square represents a pixel position, in which the gray level of the corresponding pixel is indicated. FIG. 42A represents the gray levels of the n-bit image data DI; FIG. 42B represents the gray levels of the (n+2)-bit image data DS.

The bit extender 5 extends the n-bit image data shown in FIG. 42A by two bits and outputs the resulting (n+2)-bit image data DS, shown in FIG. 42B, to the one-dimensional v-order vertical epsilon filter 13 and the one-dimensional h-order horizontal epsilon filter 14.

The two-bit extension of the image data DI in FIG. 42A converts gray level Y to 4Y and converts gray level (Y+1) to 4(Y+1), producing the (n+2)-bit image data DS shown in FIG. 42B.

The operation of the one-dimensional v-order vertical epsilon filter 13 will now be described.

Figures 43A, 43B, 44:
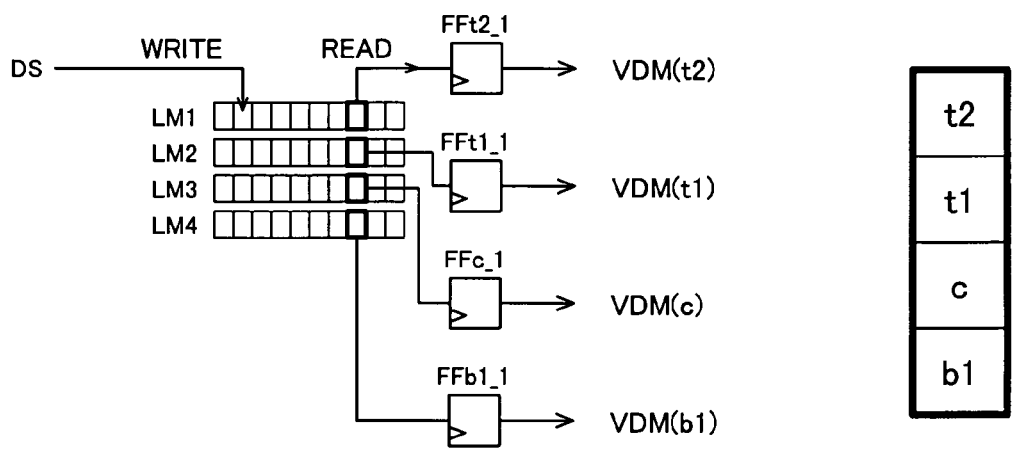
FIGS. 43A and 43B illustrate the structure of the vertical data storage unit in FIG. 40.
FIG. 44 illustrates the output of the vertical data storage unit in FIG. 40.

The vertical data storage unit 15 in FIG. 40 is configured as shown in FIG. 43A, for example.

The vertical data storage unit 15 in FIG. 40 includes four line memories LM1 to LM4 and four flip-flops FFt2_1, FFt1_1, FFc_1, and FFb1_1. The image signal DS is input through the line memories LM1 to LM4 to the four flip-flops.

Each of the line memories LM1 to LM4 can store one horizontal line of image data; the four line memories LM1 to LM4 hold four consecutive lines of data.

Starting from the left ends of the lines and proceeding in sequence to the right, data for pixels aligned vertically in the same column are simultaneously read from the line memories LM1 to LM4 and supplied to the flip-flops FFt2_1, FFt1_1, FFc_1, FFb1_1. Accordingly, data for a region consisting of four vertically consecutive pixels as shown in FIG. 43B are held simultaneously in the flip-flops FFt2_1, FFt1_1, FFc_1, FFb1_1.

The data held by the flip-flops FFt2_1, FFt1_1, FFc_1, and FFb1_1 are output simultaneously as data VDM(t2), VDM (t1), VDM(c), and VDM (b1).

For example, the vertical data storage unit 15 holds the data for the region surrounded by the bold line TL in FIG. 44, consisting of four vertically aligned consecutive pixels, and outputs the data VDM(t2), VDM(t1), VDM(c), VDM(b1) for these four pixels all at once. In this case, the third pixel from the top in the region within the bold line TL (the pixel in the third row in region TL) is the pixel of interest (the pixel on the line of interest), and its (vertical) coordinate value is represented as c. In the example in FIG. 44, the following data are output and supplied to the vertical difference calculators 16-1 to 16-4.

$VDM(t2)=4Y+4$ $VDM(t1)=4Y+4$ $VDM(c)=4Y$ $VDM(b1)=4Y$

In this way, the vertical data storage unit 15 simultaneously outputs the image data VDM(c) of the pixel of interest P(c) at pixel position c together with the image data VDM(t2), VDM (t1), and VDM(b1) of three adjacent pixels aligned vertically with the pixel of interest.

The first vertical difference calculator 16-1 generates the difference VED(t2) between the value of the pixel of interest VDM(c) and the value of the data of the top neighboring pixel VDM(t2), and outputs the difference data to the first epsilon decision unit 9-1 and the conditional weighted averager 10. The difference calculators 8-2 to 8-16 generate similar differences VED(t1), VED(c), and VED(b1) from the pixel data VDM(t1), VDM(c), and VDM(b1), and output the difference data to the epsilon decision units 9-2 to 9-16 and the conditional weighted averager 10.

FIG. 45 shows the data VDM(k) output from the vertical data storage unit 15, the data VED(k) generated by the vertical difference calculators 16-1 to 16-4, the data. VEE(k) generated by the vertical epsilon decision units 17-1 to 17-4, and the data VEM generated by the vertical conditional weighted averager 18, together with the value of f{ED(k)} obtained in the operation in the vertical conditional weighted averager 18, when the pixel of interest is P(c) in FIG. 44.

The output of the first vertical difference calculator 16-1 is:

$VED(t2)=VDM(t2)-VDM(c)=(4Y+4)-4Y=4.$

The output of the second vertical difference calculator 16-2 is:

$VED(t1)=VDM(t1)-VDM(c)=(4Y+4)-4Y=4.$

The output of the third vertical difference calculator 16-3 is:

$VED(c)=VDM(c)-VDM(c)=4Y-4Y=0$

The output of the fourth vertical difference calculator 16-4 is:

$VED(b1)=VDM(b1)-VDM(c)=4Y-4Y=0$

Like the epsilon decision units described in the first embodiment, the first vertical epsilon decision unit 17-1 generates '0' when the difference VED(t2) is greater than ϵ and generates '1' when the difference VED(t2) is equal to or less than ϵ. The vertical epsilon decision units 17-2 to 17-4 generate similar decision data VEE(t1), VEE(c), and VEE(b1)

based on the difference data VED(t1), VED(c), and VED(b1). The generated decision data are output to the vertical conditional weighted averager 18.

In the example shown in FIG. 44, since four (4) is input to the vertical epsilon decision units 17-1 and 17-2 and zero (0) is input to the vertical epsilon decision units 17-3 and 17-4, if $\epsilon$ is equal to four ($\epsilon=4$), the difference data VED(t2) to VED(b1) are all equal to or less than $\epsilon$ and the decision data VEE(t2) to VEE(b1) are all '1'.

The vertical conditional weighted averager 18 calculates the weighted average of the difference data VED(t2) to VED(b1) conditional on the decision data VEE(t2) to VEE(b1). When the decision data are '1', the difference data are multiplied by respective coefficients $a_k$ and the products are summed; when the decision data are '0', the products are not included in the sum.

If the coefficients $a_k$ ($a_{t2}$, $a_{t1}$, $a_c$, $a_{b1}$) are all one-fourth (0.25), then since the decision data VEE(t2) to VEE(b1) are all '1', the output VEM of the vertical conditional weighted averager 18 is given by equation (12).

$$EM = a_{t2} \times VED(t2) + a_{t1} \times VED(t1) + a_c \times VED(c) + \qquad (12)$$
$$a_{b1} \times VED(b1)$$
$$= 0.25 \times 4 + 0.25 \times 4 + 0.25 \times 0 + 0.25 \times 0$$
$$= 2$$

The above processing is carried out sequentially on the image data DS supplied from the bit extender 5, each pixel becoming the pixel of interest in turn, so an operation similar to equation (12) is carried out for each successive pixel.

FIG. 46 shows the weighted average data VEM corresponding to the image data VDM in FIG. 44, that is, the weighted average values VEM when the pixel at each position (i, j) is the pixel of interest. The value at each pixel position represents a gray level. The vertical conditional weighted averager 18 outputs the weighted value VEM to the vertical data adder 19.

The vertical data adder 19 adds the image data DS shown in FIG. 44 to the weighted average values VEM shown in FIG. 46, and outputs the resulting image data VDO shown in FIG. 47. The value at each pixel position represents the gray level of the data VDO.

The operation of the one-dimensional h-order horizontal epsilon filter 14 will now be described. The basic data storage unit 20 in the one-dimensional h-order horizontal epsilon filter 14 has the same structure as the data storage unit 7 in the first embodiment, holds data for four horizontally consecutive pixels such as the data in the region surrounded by the bold line TL in FIG. 48, for example, and outputs the data simultaneously as BDM(l2), BDM(l1), BDM(c), and BDM(r1). In this example, the third pixel from the left end of the region within the bold line TL in the second line from the top is the pixel of interest, and its horizontal coordinate value is denoted c.

FIG. 49 shows the data BDM(k) output from the basic data storage unit 20, the corresponding difference data BED(k) generated by the basic data difference calculators 21-1 to 21-4, and the decision data HEE(k) generated by the horizontal epsilon decision units 22-1 to 22-4 when the pixel P(c) in FIG. 48 is the pixel of interest.

In the example shown, the basic data storage unit 20 outputs 4Y as BDM(l2) and BDM(l1), and (4Y+4) as BDM(c) and BDM(r1), to the basic data difference calculators 21-1 to 21-4. In this way, the basic data storage unit 20 simultaneously outputs the image data BDM(c) of the pixel of interest P(c) and the image data BDM(l2), BDM(l1), and BDM(r1) of neighboring pixels aligned horizontally and consecutively with the pixel of interest.

The output of the first basic data difference calculator 21-1 is:

$$BED(l2)=BDM(l2)-BDM(c)=4Y-(4Y+4)=-4.$$

The output of the second basic data difference calculator 21-2 is:

$$BED(l1)=BDM(l1)-BDM(c)=4Y-(4Y+4)=-4.$$

The output of the third basic data difference calculator 21-3 is:

$$BED(c)=BDM(c)-BDM(c)=(4Y+4)-(4Y+4)=0$$

The output of the fourth basic data difference calculator 21-4 is:

$$BED(r1)=BDM(r1)-BDM(c)=(4Y+4)-(4Y+4)=0$$

In this way, the basic data difference calculators 21-1 to 21-4 calculate the differences between the image data BDM(c) for the pixel of interest and the image data for the four horizontally consecutive pixels surrounding and including the pixel of interest, and output the results to the horizontal epsilon decision units 22-1 to 22-4.

Like the epsilon decision units described in the first embodiment, the first horizontal epsilon decision unit 22-1 generates '0' when the difference BED(l2) is greater than $\epsilon$ and generates '1' when the difference BED(l2) is equal to or less than $\epsilon$. Horizontal epsilon decision units 22-2 to 22-4 generate similar decision data HEE(l1), HEE(c), and HEE(r1) from the difference data BED(l1), BED(c), and BED(r1). The generated decision data are output to the horizontal conditional weighted averager 25.

In the example shown in FIG. 49, minus four (−4) is input to horizontal epsilon decision units 22-1 and 22-2 as difference data BED(l2) and BED(l1); zero (0) is input to horizontal epsilon decision units 22-3 and 22-4 as difference data BED(c) and BED(r1). The difference data BED(l2) to BED(r1) are all equal to or less than $\epsilon$, so the decision data HEE(l2) to HEE(r1) are all '1'. The decision data HEE(l2) to HEE(r1) output from the horizontal epsilon decision units 22-1 to 22-4 are supplied to the horizontal conditional weighted averager 25.

The operation of the horizontal data storage unit 23 will be described with reference to FIG. 50. The horizontal data storage unit 23 has the same structure as the data storage unit 7 in the first embodiment, holds data (not the basic data VDM, but vertically filtered data output from the vertical data adder 19) for horizontally consecutive pixels in the region surrounded by the bold line TL in FIG. 50, for example, and outputs the data simultaneously as HDM(l2), HDM(l1), HDM(c), and HDM(r1). In this example, the third pixel from the left end of the region within the bold line TL in the second line from the top is the pixel of interest, and its horizontal coordinate value is denoted c. In this way, the horizontal data storage unit 23 simultaneously outputs the image data HDM(c) for the pixel of interest P(c), and the image data HDM(l2), HDM(l1), and HDM(r1) for neighboring pixels horizontally consecutive with the pixel of interest.

FIG. 51 shows the data HDM(k) output from the horizontal data storage unit 23, the corresponding difference data HED(k) generated by the horizontal difference calculators 24-1 to 24-4, and the decision data HEE(k) generated by the horizontal epsilon decision units 22-1 to 22-4 when the pixel P(c) in FIG. 50 is the pixel of interest, together with the values of f{ED(k)} obtained in the operation of the horizontal conditional weighted averager 25.

In the example shown, the horizontal data storage unit 23 outputs 4Y as HDM(l2) and HDM(l1), and (4Y+3) as HDM(c) and HDM(r1), to the horizontal difference calculators 24-1 to 24-4.

The output of the first horizontal difference calculator 24-1 is:

$$HED(l2)=HDM(l2)-HDM(c)=4Y-(4Y+3)=-3.$$

The output of the second horizontal difference calculator 24-2 is:

$$HED(l1)=HDM(l1)-HDM(c)=4Y-(4Y+3)=-3.$$

The output of the third horizontal difference calculator 24-3 is:

$$HED(c)=HDM(c)-HDM(c)=(4Y+3)-(4Y+3)=0$$

The output of the fourth horizontal difference calculator 24-4 is:

$$HED(r1)=HDM(r1)-HDM(c)=(4Y+3)-(4Y+3)=0$$

In this way, the horizontal difference calculators 24-1 to 24-4 calculate the differences between the image data HDM(c) for the pixel of interest and the image data for four horizontally consecutive pixels surrounding and including the pixel of interest, and output the difference data as HED(l2), HED(l1), HED(c), and HED(r1) to the horizontal conditional weighted averager 25.

Concurrent with the output of the difference data with respect of the pixel of interest, the horizontal epsilon decision units 22-1 to 22-4 output horizontal epsilon decision data HEE(l2), HEE(l1), HEE(c), and HEE(r1) with respect to the same pixel of interest to the horizontal conditional weighted averager 25.

The horizontal conditional weighted averager 25 calculates the weighted average of the difference data HED(l2) to HED(r1) conditional on the decision data HEE(l2) to HEE(r1). When the decision data are '1', the difference data are multiplied by respective coefficients $a_k$ and the products are summed; when the decision data are '0', the products are not included in the sum.

If the coefficients $a_k$ ($a_{l2}$, $a_{l1}$, $a_c$, $a_{r1}$) are all one-fourth (0.25), then since the decision data HEE(l2) to HEE(r1) are all '1', the output HEM of the horizontal conditional weighted averager 25 is given by equation (13).

$$\begin{aligned} EM &= a_{l2} \times HED(l2) + a_{l1} \times HED(l1) + a_c \times HED(c) + \\ & \quad a_{r1} \times HED(r1) \\ &= 0.25 \times -3 + 0.25 \times -3 + 0.25 \times 0 + 0.25 \times 0 \\ &\approx 2 \end{aligned} \quad (13)$$

The above processing is carried out sequentially on the image data VDO supplied from the vertical data adder 19 and the image data DS supplied from the bit extender 5, each pixel becoming the pixel of interest in turn, so an operation similar to equation (13) is carried out for each successive pixel.

FIG. 52 shows the weighted average data HEM corresponding to the image data HDM in FIG. 50, that is, the weighted average values HEM when the pixel at each pixel position (i, j) is the pixel of interest. The value at each pixel position represents a gray level. The horizontal conditional weighted averager 25 outputs the weighted value HEM to the horizontal data adder 26.

The horizontal data adder 26 adds the image data VDO shown in FIG. 47 to the weighted average HEM shown in FIG. 52, and outputs the image data DO shown in FIG. 53. The value at each pixel position represents the gray level of the data DO.

As described above, this embodiment can increase the number of effective gray levels in a region with gradually changing gray levels in at least the horizontal or vertical direction. When the order h of the horizontal epsilon filter is equal to $2^2$ (h=4) and the order v of the vertical epsilon filter is equal to $2^2$ (h=4), jumps by four (a power of two) gray levels from 4Y to (4Y+4) in a region with gradually changing gray levels as shown in FIG. 48 can be smoothed out by interpolating levels of (4Y+1), (4Y+2), and (4Y+3).

As in the first embodiment, if the orders h and v of the epsilon filters are set to values greater than $2^\alpha$, an image with gray levels that change more gradually can be obtained. If h and v are powers of two such as $2^\alpha$, $(2 \times 2^\alpha)$ or $(2^2 \times 2^\alpha)$, the epsilon filters can carry out division by bit shifting, which eliminates the need for a divider circuit.

In the above description, the thresholds $\epsilon$ of the epsilon filters were equal to $2^\alpha$, but this is not a limitation. Using thresholds $\epsilon$ greater than $2^\alpha$ can not only increase the number of gray levels but also reduce noise.

Figure 54:
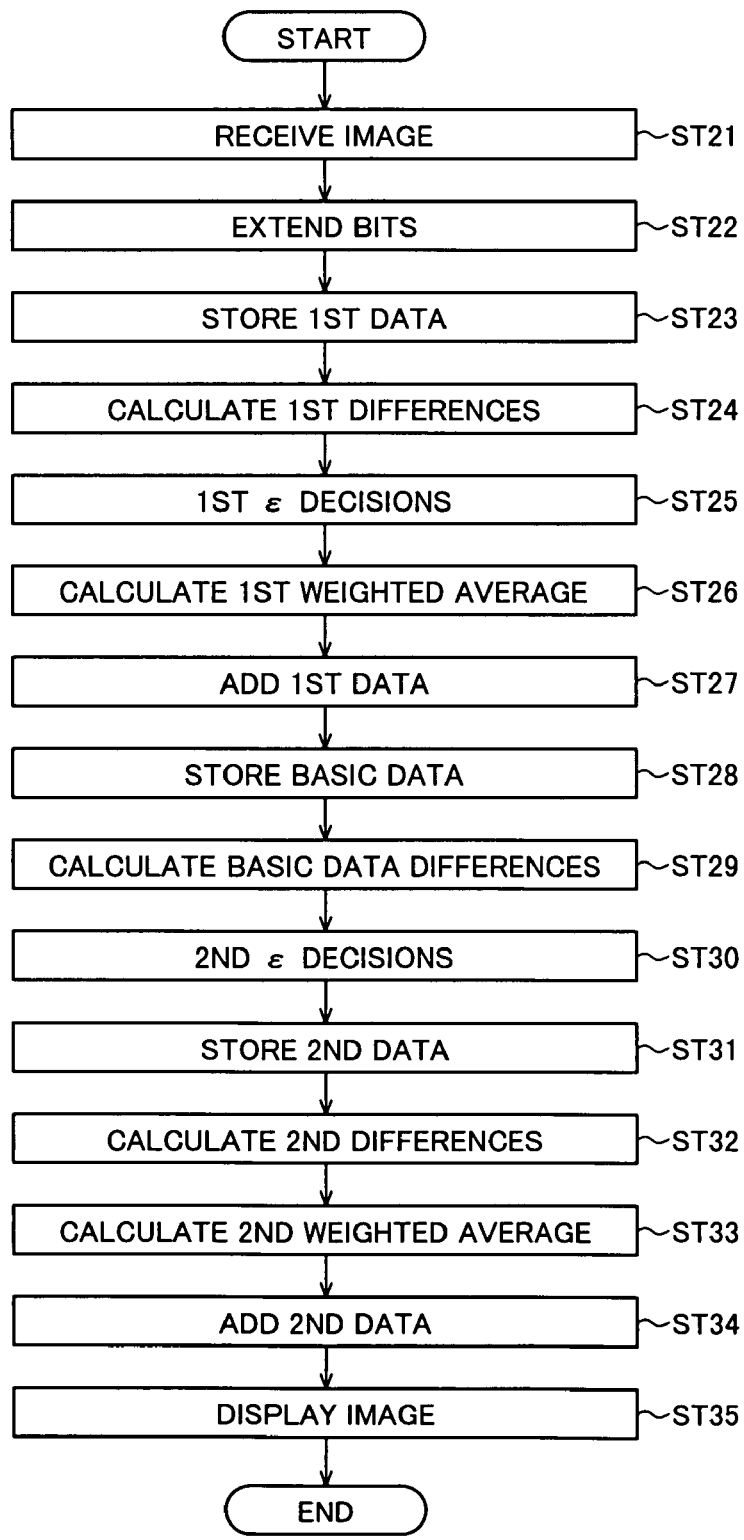
FIG. 54 is a flowchart illustrating the processing steps carried out by the image display apparatus in the third embodiment.

The processing steps carried out by the image display apparatus in the third embodiment will be described with reference to the flowchart in FIG. 54. It will be assumed in the following description that the order of the epsilon filter is m, and the notation in FIGS. 36, 37, and 38 will be used.

First, an image signal SA is input to the input terminal 1; the receiver 2 receives the image signal SA and outputs n-bit image data DI (step ST21).

The image data DI output from the receiver 2 are input to the bit extender 5 in the gray scale expansion processor 3. The bit extender 5 extends the image data DI by a bits and outputs (n+α)-bit image data DS to the data storage unit 37 (step ST22).

The vertical data storage unit 15 in the one-dimensional v-order vertical epsilon filter 13 receives the (n+α)-bit image data DS, holds data for v vertically consecutive pixels (v≧$2^\alpha$), and outputs the pixel data as VDM(1) to VDM(v) to the vertical difference calculators 16-1 to 16-v (step ST23).

The vertical difference calculators 16-1 to 16-v receive the vertically consecutive pixel data VDM(1) to VDM(v), take differences between the v pixels and the pixel of interest VDM(c), and output the difference data VED(1) to VED(v) to the vertical epsilon decision units 17-1 to 17-v (step ST24).

The vertical epsilon decision units 17-1 to 17-v receive the difference data VED(1) to VED(v) and output decision data VEE(1) to VEE(v) that indicate which difference data to select (step ST25).

The vertical conditional weighted averager 18 in the one-dimensional v-order vertical epsilon filter 13 receives the difference data VED(1) to VED(v) and the decision data VEE(1) to VEE(v), takes a weighted average of the difference data selected by the decision data, and outputs the weighted average value VEM (step ST26).

The vertical data adder 19 in one-dimensional v-order vertical epsilon filter 13 receives the weighted average value VEM and the basic data VDM(c) for the pixel of interest, adds VEM and VDM(c), and outputs the result as image data VDO (step ST27).

The basic data storage unit 20 in the one-dimensional h-order horizontal epsilon filter 14 receives the (n+α)-bit image data DS, holds data for h horizontally consecutive pixels (h≧$2^\alpha$), and outputs the data as BDM(1) to BDM(h) (step ST28).

The basic data difference calculators 21-1 to 21-$h$ in the one-dimensional h-order horizontal epsilon filter 14 receive the horizontally consecutive data BDM(1) to BDM(h), take differences between the h pixels and the pixel of interest BDM(c), and output the difference data BED(1) to BED(h) (step ST29).

The horizontal epsilon decision units 22-1 to 22-$h$ in the one-dimensional h-order horizontal epsilon filter 14 receive the difference data BED(1) to BED(h) and output decision data HEE(1) to HEE(h) that indicate which difference data to select (step ST30).

The horizontal data storage unit 23 in the one-dimensional h-order horizontal epsilon filter 14 receives the (n+α)-bit image data VDO, holds data for h horizontally consecutive pixels (h≧$2^\alpha$), and outputs the data as HDM(1) to HDM(h) (step ST31).

The horizontal difference calculators 24-1 to 24-$h$ in the one-dimensional h-order horizontal epsilon filter 14 receive the horizontally consecutive data HDM(1) to HDM(h), take differences between the h pixels and the pixel of interest HDM(c), and output the difference data HED(1) to HED(h) (step ST32).

The horizontal conditional weighted averager 25 in the one-dimensional h-order horizontal epsilon filter 14 receives the difference data HED(1) to HED(h) and the decision data HEE(1) to HEE(h), takes a weighted average of the difference data selected by the decision data, and outputs the weighted average value HEM (step ST33).

The horizontal data adder 26 in the one-dimensional h-order horizontal epsilon filter 14 receives the weighted average value HEM and the basic (n+α)-bit data HDM(c) for the pixel of interest, adds HEM and HDM(c), and outputs the result as the image data DO (step ST34).

The output image data DO are input to the display unit 4, which displays the image (step ST18).

Figure 55:
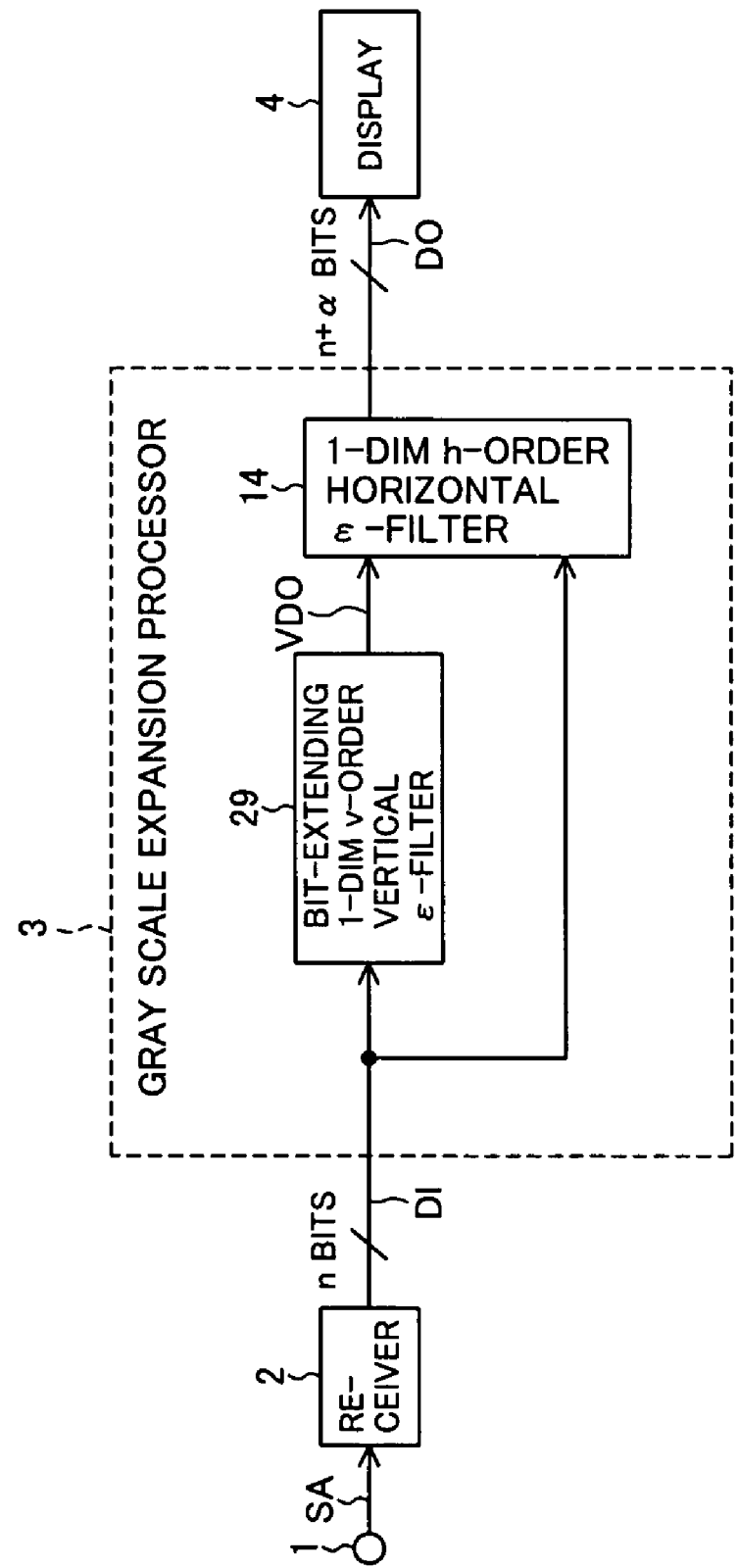
FIG. 55 is a block diagram illustrating another exemplary structure of the image display apparatus in the third embodiment.

Another exemplary structure of the image display apparatus in the third embodiment will be described with reference to FIG. 55. The image display apparatus in FIG. 55 is generally similar to the image display apparatus in FIG. 36, but does not include the bit extender 5 in FIG. 36 and has a bit-extending one-dimensional v-order vertical epsilon filter 29 in place of the one-dimensional v-order vertical epsilon filter 13. The bit-extending one-dimensional v-order vertical epsilon filter 29 has, for example, the structure shown in FIG. 56.

Figure 37:
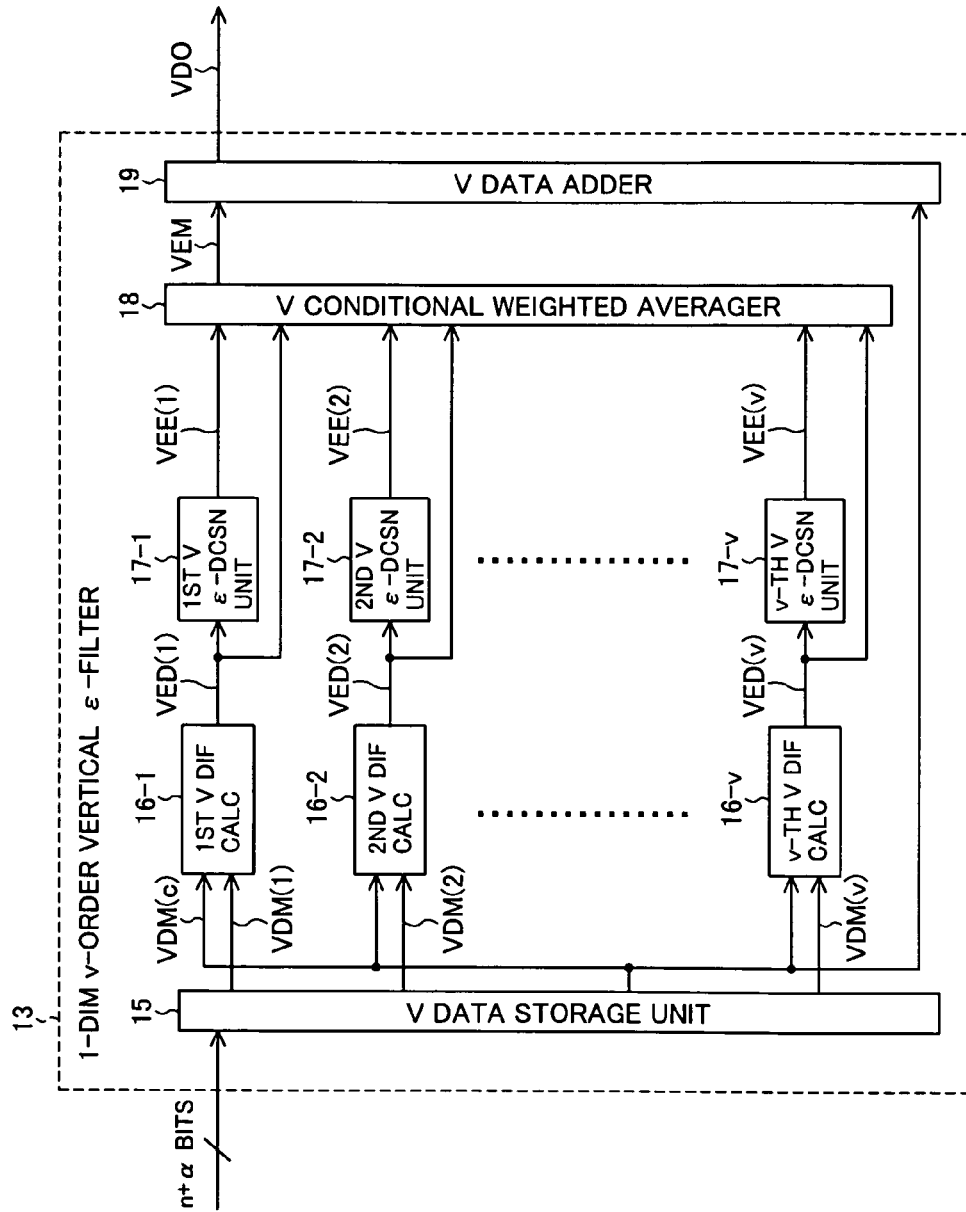
FIG. 37 is a block diagram illustrating an exemplary structure of the one-dimensional v-order vertical epsilon filter in FIG. 36.
Figure 56:
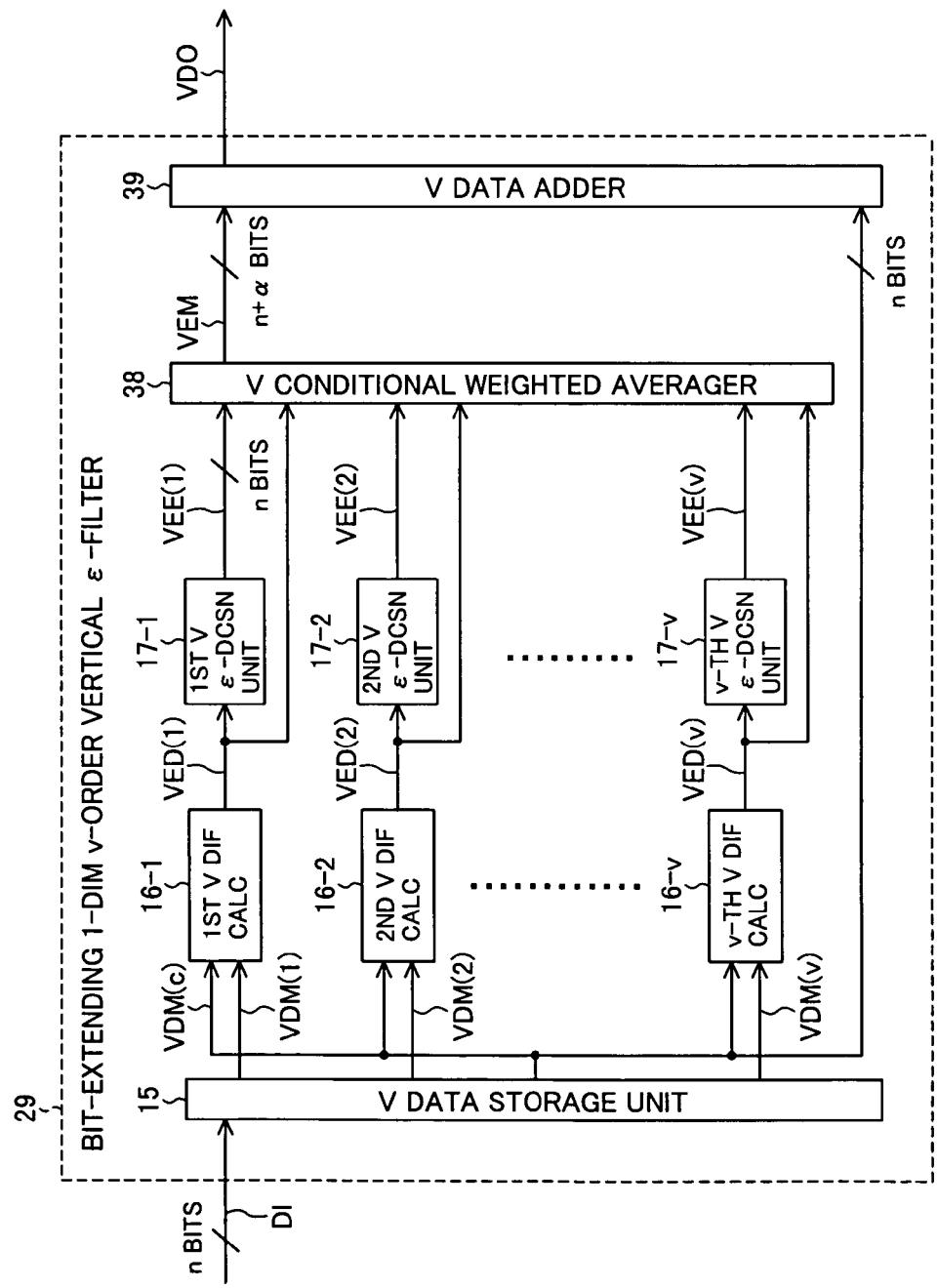
FIG. 56 is a block diagram illustrating an exemplary structure of the bit-extending one-dimensional v-order vertical epsilon filter in FIG. 55.

The bit-extending one-dimensional v-order vertical epsilon filter 29 shown in FIG. 56 is generally similar to the one-dimensional v-order vertical epsilon filter 13 in FIG. 37, but has a different vertical conditional weighted averager 38 and vertical data adder 39.

The vertical difference calculators 16-1 to 16-$v$ and the vertical epsilon decision units 17-1 to 17-$v$ process n-bit data. The threshold value for vertical epsilon decision units 17-1 to 17-$v$ is set to '1', because there is no bit extender preceding the epsilon filter 29.

The vertical conditional weighted averager 38 calculates a conditional weighted average as described in the example above (FIG. 45), but also calculates bits following the radix point and outputs a of these bits in the weighted average data VEM, which accordingly have (n+α) bits.

The vertical data adder 39 extends the n-bit input data VDM(c) to (n+α) bits and adds the result to the VEM data.

Figure 38:
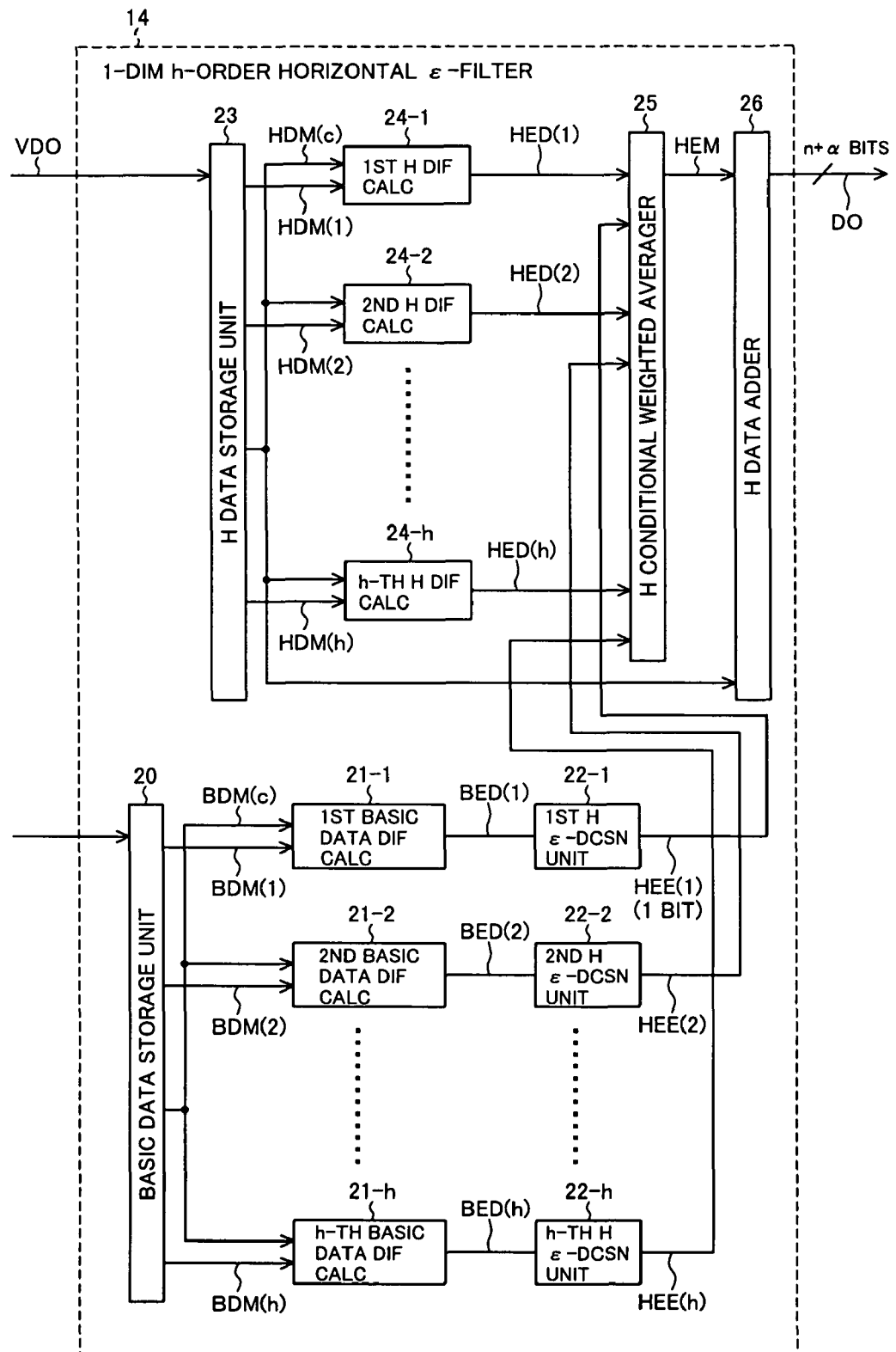
FIG. 38 is a block diagram illustrating an exemplary structure of the one-dimensional h-order horizontal epsilon filter in FIG. 36.

The one-dimensional h-order horizontal epsilon filter 14 in FIG. 55 may be identical to the one-dimensional h-order horizontal epsilon filter 14 shown in FIG. 38.

Although the image display apparatus in FIG. 55 carries out a bit extension as part of the operation of the vertical epsilon filter 29 instead of at a stage preceding the vertical epsilon filter, this structure can produce the same effect as the structure in FIG. 36.

Examples in which a was equal to two (α=2) and n-bit image data were extended to (n+2) bits were described in the first to third embodiments. These examples are useful when eight-bit digital broadcast television pictures are displayed on a display unit with ten-bit gray-scale resolution, but the present invention is not limited to any particular value of the parameter α.

Similarly, it was assumed that the threshold ε is $2^\alpha$ in the first to third embodiments, but the present invention is not limited to this threshold value. Using values of ε greater than $2^\alpha$ can improve the interpolation performance at edges that are not perfectly sharp, and enables the image processing apparatus to remove more noise that may have been present in the original image.

Since the differences ED(c), ED(c, c), VED(c), and BED(c) between the pixel of interest and itself are always zero and accordingly the results of the epsilon decisions EE(c), EE(c, c), VEE(c), and HEE(c) based on these differences are always '1', it is possible to omit the difference calculators (such as the third difference calculator 8-3 in FIG. 4, the eleventh difference calculator 8-11 in FIG. 24, the third vertical difference calculator 16-3 in FIG. 40, and the third basic data difference calculator 21-3 in FIG. 41) for obtaining the differences between the pixel of interest and itself and the epsilon decision units (the third epsilon decision unit 9-3 in FIG. 4, the eleventh epsilon decision unit 9-11 in FIG. 24, the third vertical epsilon decision unit 17-3 in FIG. 40, and the third horizontal epsilon decision unit 22-3 in FIG. 41) for determining whether the outputs ED(c), ED(c, c), VED(c), and BED(c) are greater than the threshold ε, and zero (0) may be added unconditionally instead of ED(c), ED(c, c), VED(c), and HED(c) in the conditional weighted averagers 10, 18, and 25.

Similarly, the third horizontal difference calculator 24-3 in FIG. 41, which calculates the difference between identical data HDM(c) and always obtains zero, may be omitted and zero may be added unconditionally instead of HED(c) in the horizontal conditional weighted averager 25.

The present invention can be applied to image display apparatus in a liquid crystal, plasma, or other type of television set.

The conditional weighted averages in the examples above were all simple conditional averages, that is, all weights were equal, but unequal weights may also be used.

Those skilled in the art will recognize that further variations are possible within the scope of the invention, which is defined in the appended claims.

What is claimed is:

1. An image processing apparatus comprising:
   a bit extender that receives n-bit image data, carries out an α-bit bit extension, and outputs resultant basic (n+α)-bit image data, n and α being positive integers; and
   an edge-preserving smoothing filter for smoothing the basic (n+α)-bit image data by using additional gray levels provided by the bit extension,
   wherein the edge-preserving smoothing filter is an epsilon filter having a threshold value ε equal to $2^\alpha$.

2. The image processing apparatus of claim 1, wherein the epsilon filter is a one-dimensional epsilon filter having an order m equal to or greater than $2^\alpha$ and the epsilon filter processes the basic (n+α)-bit image data in a horizontal direction.

3. The image processing apparatus of claim 2, wherein:
the order m of the epsilon filter is equal to $2^d \times 2^\alpha$, d being an integer; and
the epsilon filter performs a simple conditional averaging operation.

4. The image processing apparatus of claim 2, wherein the epsilon filter further comprises:
a data storage unit for holding and simultaneously outputting the basic (n+α)-bit image data for a plurality of horizontally consecutive pixels;
a difference calculator for generating difference data indicating differences between the basic (n+α)-bit image data output by the data storage unit and the basic (n+α)-bit image data of a pixel of interest;
an epsilon decision unit for generating decision data indicating whether the difference data output from the difference calculator are greater than the threshold value α;
a conditional weighted averager for generating a weighted average value of the difference data output from the difference calculator conditional on the decision data output from the epsilon decision unit; and
a data adder for adding the basic (n+α)-bit image data of the pixel of interest to the weighted average value data.

5. The image processing apparatus of claim 1, wherein:
the epsilon filter is a two-dimensional epsilon filter that processes the basic (n+α)-bit image data for pixels in a two-dimensional region having a horizontal width of h pixels and a vertical height of v pixels, h and v both being equal to or greater than $2^\alpha$, the epsilon filter having an order m equal to h×v.

6. The image processing apparatus of claim 5, wherein:
h is equal to $2^d \times 2^\alpha$ and v is equal to $2^e \times 2^\alpha$, d and e being integers; and
the epsilon filter performs a simple conditional averaging operation.

7. The image processing apparatus of claim 5, wherein the two-dimensional m-order epsilon filter comprises:
a data storage unit for holding and simultaneously outputting the basic (n+α)-bit image data for said two-dimensional region;
a difference calculator for generating difference data indicating differences between the basic (n+α)-bit image data output by the data storage unit and the basic (n+α)-bit image data of a pixel of interest;
an epsilon decision unit for generating decision data indicating whether the difference data output from the difference calculator are greater than the threshold value α;
a conditional weighted averager for generating a weighted average value of the difference data output from the difference calculator conditional on the decision data output from the epsilon decision unit; and
a data adder for adding the basic (n+α)-bit image data of the pixel of interest to the weighted average value data.

8. The image processing apparatus of claim 1, wherein the epsilon filter comprises:
a one-dimensional vertical epsilon filter having an order v for processing the basic (n+α)-bit image data in a vertical direction, v being equal to or greater than $2^\alpha$; and
a one-dimensional horizontal epsilon filter having an order h for processing data output from the one-dimensional v-order vertical epsilon filter, h being equal to or greater than $2^\alpha$.

9. The image processing apparatus of claim 8, wherein:
h is equal to $2^\alpha \times 2^\alpha$ and v is equal to $2^e \times 2^\alpha$, d and e being integers; and
the one-dimensional vertical epsilon filter and the one-dimensional horizontal epsilon filter perform simple conditional averaging operations.

10. The image processing apparatus of claim 8, wherein:
the one-dimensional vertical epsilon filter comprises
a vertical data storage unit for holding and simultaneously outputting the basic (n+α)-bit image data for a plurality of vertically consecutive pixels,
a vertical difference calculator for generating first difference data indicating differences between the basic (n+α)-bit image data output by the vertical data storage unit and the basic (n+α)-bit image data of a pixel of interest,
a vertical epsilon decision unit for generating first decision data indicating whether the first difference data are greater than the threshold value ε,
a vertical conditional weighted averager for generating a first weighted average value of the first difference data conditional on the first decision data, and
a vertical data adder for adding the basic (n+α)-bit image data of the pixel of interest to the first weighted average value data to generate vertically smoothed (n+α)-bit image data; and
the one-dimensional horizontal epsilon filter comprises
a basic data storage unit for holding and simultaneously outputting the basic (n+α)-bit image data for a plurality of horizontally consecutive pixels,
a basic data difference calculator for generating second difference data indicating differences between the basic (n+α)-bit image data output by the basic data storage unit and the basic (n+α)-bit image data of the pixel of interest,
a horizontal epsilon decision unit for generating second decision data indicating whether the second difference data are greater than the threshold value ε,
a horizontal data storage unit for holding and simultaneously outputting the vertically smoothed (n+α)-bit image data for the plurality of horizontally consecutive pixels;
a horizontal difference calculator for generating third difference data indicating differences between the vertically smoothed (n+α)-bit image data output by the horizontal data storage unit and the vertically smoothed (n+α)-bit image data of the pixel of interest;
a horizontal conditional weighted averager for generating a second weighted average value of the third difference data conditional on the second decision data; and
a horizontal data adder for adding the vertically smoothed (n+α)-bit image data of the pixel of interest to the second weighted average value data.

11. An image display apparatus comprising:
a receiver for receiving an analog image signal and converting the analog image signal to n-bit image data, n being a positive integer;
a bit extender for receiving the n-bit image data, performing an α-bit bit extension, and outputting resultant basic (n+α)-bit image data, α being a positive integer;
an edge-preserving smoothing filter for smoothing the basic (n+α)-bit image data by using additional gray levels provided by the bit extension to generate smoothed (n+α)-bit image data; and
a display unit for displaying the smoothed (n+α)-bit image data, wherein the edge-preserving smoothing filter is an epsilon filter having a threshold value ε equal to $2^\alpha$.

12. An image processing method comprising:
receiving n-bit image data by utilizing an edge-preserving smoothing filter having a threshold value ε equal to $2^\alpha$, the smoothing filter performing an α-bit bit extension, and outputting resultant basic (n+α)-bit image data, n and α being positive integers;

holding and simultaneously outputting the basic (n+α)-bit image data for a plurality of consecutive pixels;

generating difference data indicating differences between the simultaneously output basic (n+α)-bit image data and the basic (n+α)-bit image data of a pixel of interest;

generating decision data indicating whether the difference data are greater than the threshold value $\epsilon$;

generating a weighted average value of the difference data conditional on the decision data; and adding the basic (n+α)-bit image data of the pixel of interest to the weighted average value data.

13. An image processing apparatus comprising a bit-extending edge-preserving smoothing filter that receives n-bit image data, carries out an α-bit bit extension, and outputs resultant (n+α)-bit image data, n and α being positive integers, wherein the bit-extending edge-preserving smoothing filter comprises a bit-extending epsilon filter having a threshold value $\epsilon$ equal to $2^{\alpha}$.

14. An image processing method comprising:

receiving n-bit image data, performing an α-bit bit extension, and outputting resultant basic (n+α)-bit image data, n and a being positive integers;

holding and simultaneously outputting the basic (n+α)-bit image data for pixels in a two-dimensional region having a horizontal width of h pixels and a vertical height of v pixels, h and v both being positive integers equal to or greater than $2^{\alpha}$;

generating difference data indicating differences between the basic (n+α)-bit image data for pixels in said two-dimensional region and the basic (n+α)-bit image data of a pixel of interest;

generating decision data indicating whether the difference data are greater than a threshold value $\epsilon$;

generating a weighted average value of the difference data conditional on the decision data; and adding the basic (n+α)-bit image data of the pixel of interest to the weighted average value data.

* * * * *